(12) United States Patent
Takao

(10) Patent No.: US 8,593,796 B2
(45) Date of Patent: Nov. 26, 2013

(54) DISPLAY APPARATUS AND SUPPORT STAND

(75) Inventor: Mitsuyoshi Takao, Hidaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 174 days.

(21) Appl. No.: 13/346,393

(22) Filed: Jan. 9, 2012

(65) Prior Publication Data

US 2012/0224306 A1 Sep. 6, 2012

(30) Foreign Application Priority Data

Mar. 1, 2011 (JP) ................................. 2011-044431

(51) Int. Cl.
*G06F 1/16* (2006.01)

(52) U.S. Cl.
USPC .. 361/679.21; 345/619; 348/468; 248/222.14

(58) Field of Classification Search
USPC .......... 455/41.1, 558, 334, 550.1, 517, 456.1, 455/404.2, 456.3, 418, 556.1; 345/76, 649, 345/56, 589, 520, 506, 8, 690, 619, 419, 345/156; 349/58, 62, 65, 156; 348/553, 348/563, 56, 468; 361/679.01, 679.21, 361/679.27, 679.3, 679.24, 679.08, 679.06, 361/679.22, 679.48, 679.52, 679.53, 361/679.33, 679.55, 679.04, 679.47; 248/221.11, 224.8, 231.9, 470, 317, 248/222.14, 291.1
See application file for complete search history.

(56) References Cited

U.S. PATENT DOCUMENTS

| | | | |
|---|---|---|---|
| 2006/0290835 A1* | 12/2006 | Sakuma | 349/58 |
| 2008/0198102 A1* | 8/2008 | Yamashita et al. | 345/76 |
| 2012/0229513 A1* | 9/2012 | Hayashi et al. | 345/649 |

FOREIGN PATENT DOCUMENTS

| | | |
|---|---|---|
| JP | 11-007250 | 1/1999 |
| JP | 11-184395 | 7/1999 |
| JP | 2005-136651 | 5/2005 |
| JP | 2008-136160 | 6/2008 |

\* cited by examiner

*Primary Examiner* — Hung Duong
(74) *Attorney, Agent, or Firm* — Blakely, Sokoloff, Taylor & Zafman LLP

(57) ABSTRACT

A display apparatus includes: a display case including a display screen exposed on one side of the display case; a support member supporting the display case; and a fixing member provided opposite to the one side and fixed to the support member at first and second positions. The fixing member includes a connector connected to an external installation face when the fixing member is fixed at the first position. The support member includes a first bottom portion and a second bottom portion located this is closer to the display case. The fixing member projects from the second bottom portion to the side opposite to the display case with respect to the one side when the fixing member is located at the first position. The fixing member is hidden behind the support member with respect to the one side when the fixing member is located at the second position.

7 Claims, 30 Drawing Sheets

DISPLAY APPARATUS AND SUPPORT STAND

CROSS REFERENCE TO RELATED APPLICATION(S)

The application is based upon and claims the benefit of priority from Japanese Patent Application No. 2011-044431 filed on Mar. 1, 2011; the entire content of which are incorporated herein by reference.

FIELD

Exemplary embodiments described herein relate generally to a display apparatus and a support stand.

BACKGROUND

A stand which supports a display case including a display screen may be provided with a fall-preventive fixing member. In this case, the fixing member is connected to an installation face with screws or the like, whereby the assembly of the display case and the stand is prevented from falling.

However, whether to connect a stand to an installation face using a fall-preventive fixing member may depend on the user. Therefore, it is preferable that a stand or a display device that is provided with a fall-preventive fixing member be able to have a form that is suitable for a use situation desired by each user.

BRIEF DESCRIPTION OF THE DRAWINGS

Exemplary embodiments of the present invention will be described in detail based on the following figures, wherein.

DETAILED DESCRIPTION OF THE EXEMPLARY EMBODIMENTS

In general, according to one exemplary embodiment, a display apparatus includes: a display case including a display screen which is exposed to an outside on one side of the display case; a support member configured to support the display case; and a fixing member configured to be provided on a side opposite to the one side so as to be fixed to the support member at a first position and a second position, and which includes a connector configured to be connected to an external installation face when the fixing member is fixed at the first position, wherein the support member includes a first bottom portion and a second bottom portion which is located closer to the display case than the first bottom portion, and the fixing member is configured to project from the second bottom portion to the side opposite to the display case and is configured to be seen from the one side when the fixing member is fixed to the support member at the first position, and the fixing member is configured to be hidden behind the support member and is configured to be not seen from the one side when the fixing member is fixed to the support member at the second position.

An embodiment and modifications to be described below have the same components, which will be given common reference symbols and redundant descriptions therefor will be avoided. For the sake of convenience, directions are shown in each of the drawings. In a state that a case 2 is located at the center in its movable range, the X direction is the rightward direction as viewed from the front side (the leftward direction as viewed from the rear side), the Y direction is the upward direction, and the Z direction is the direction that is normal to the display screen and goes toward the front side.

Embodiment

Figure 5:
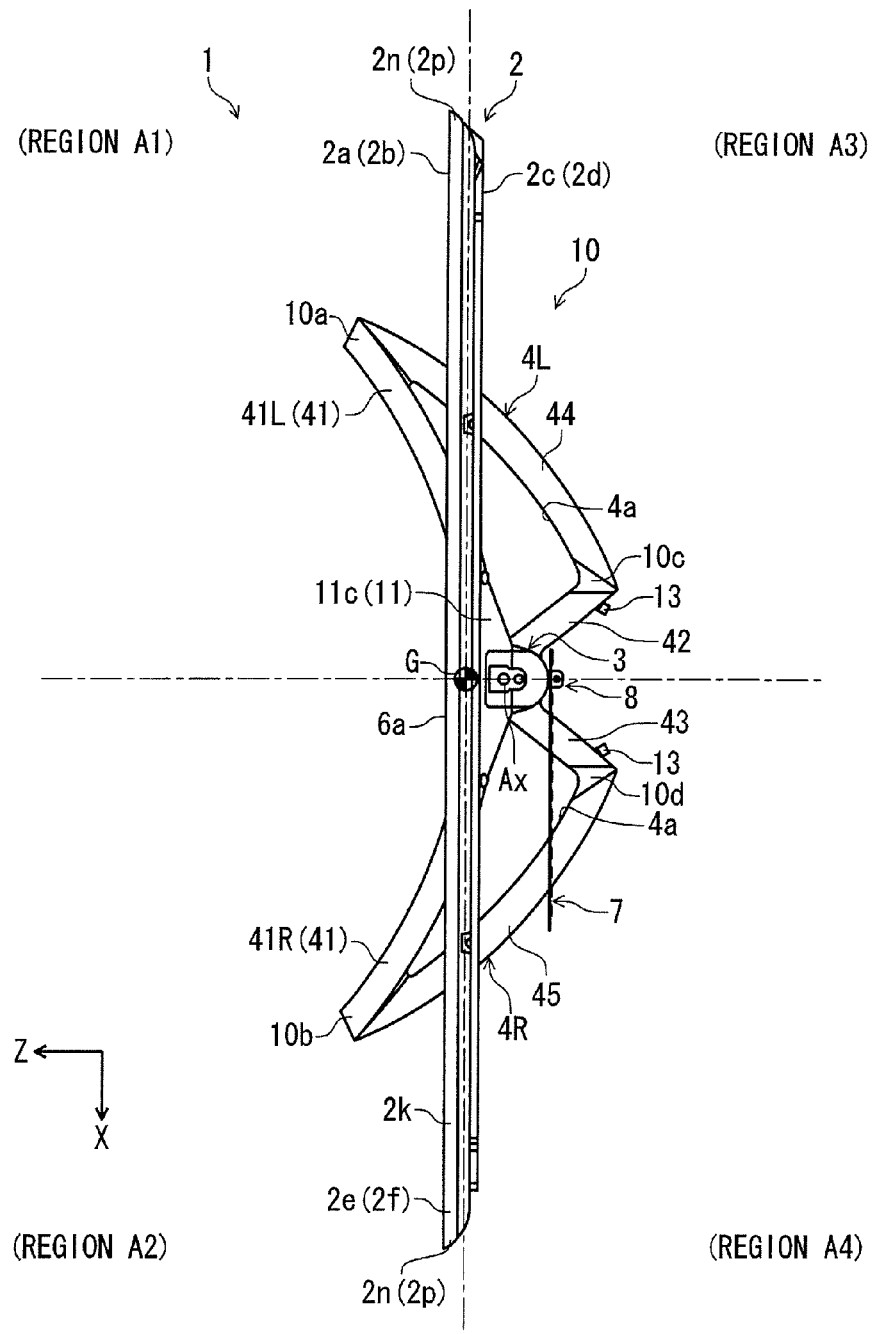
FIG. 5 is a top view of the video display apparatus.
Figure 6:
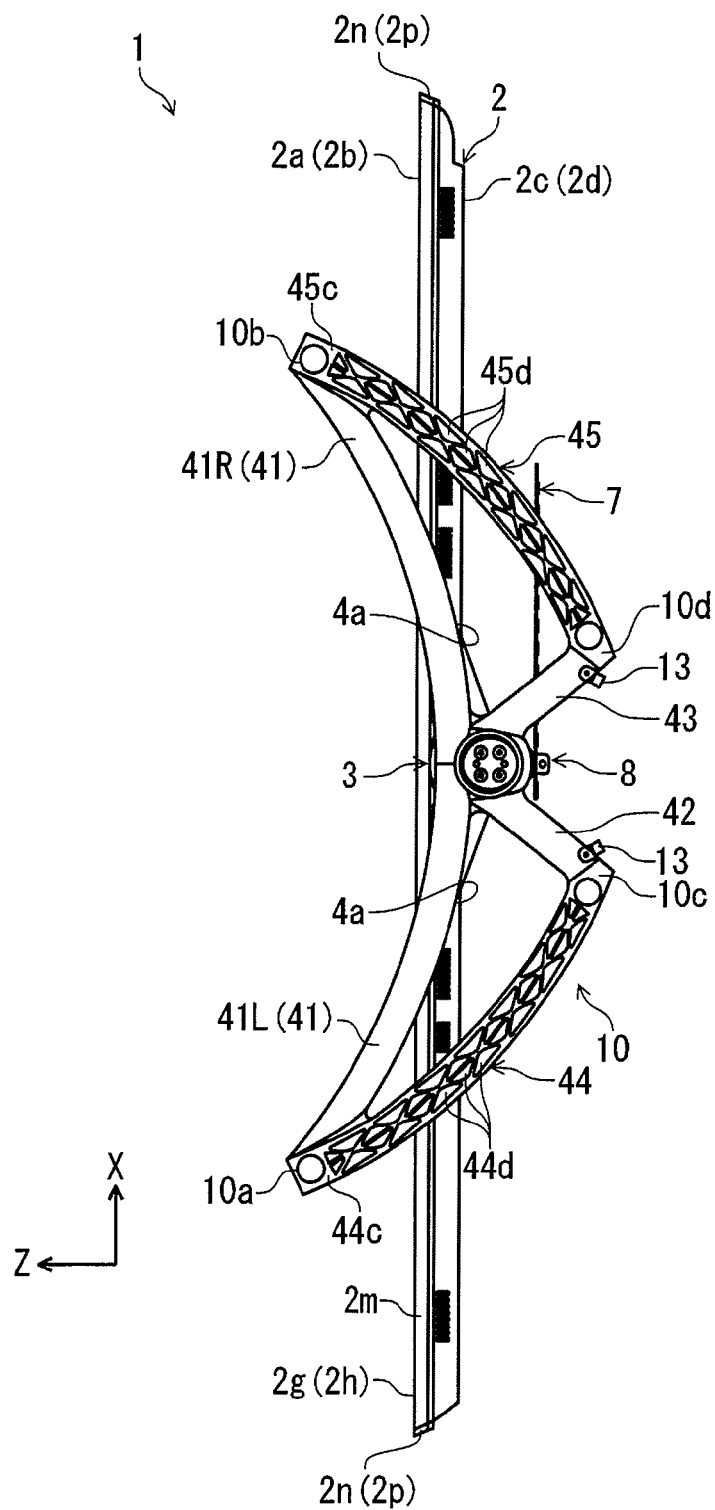
FIG. 6 is a bottom view of the video display apparatus.
Figure 7:
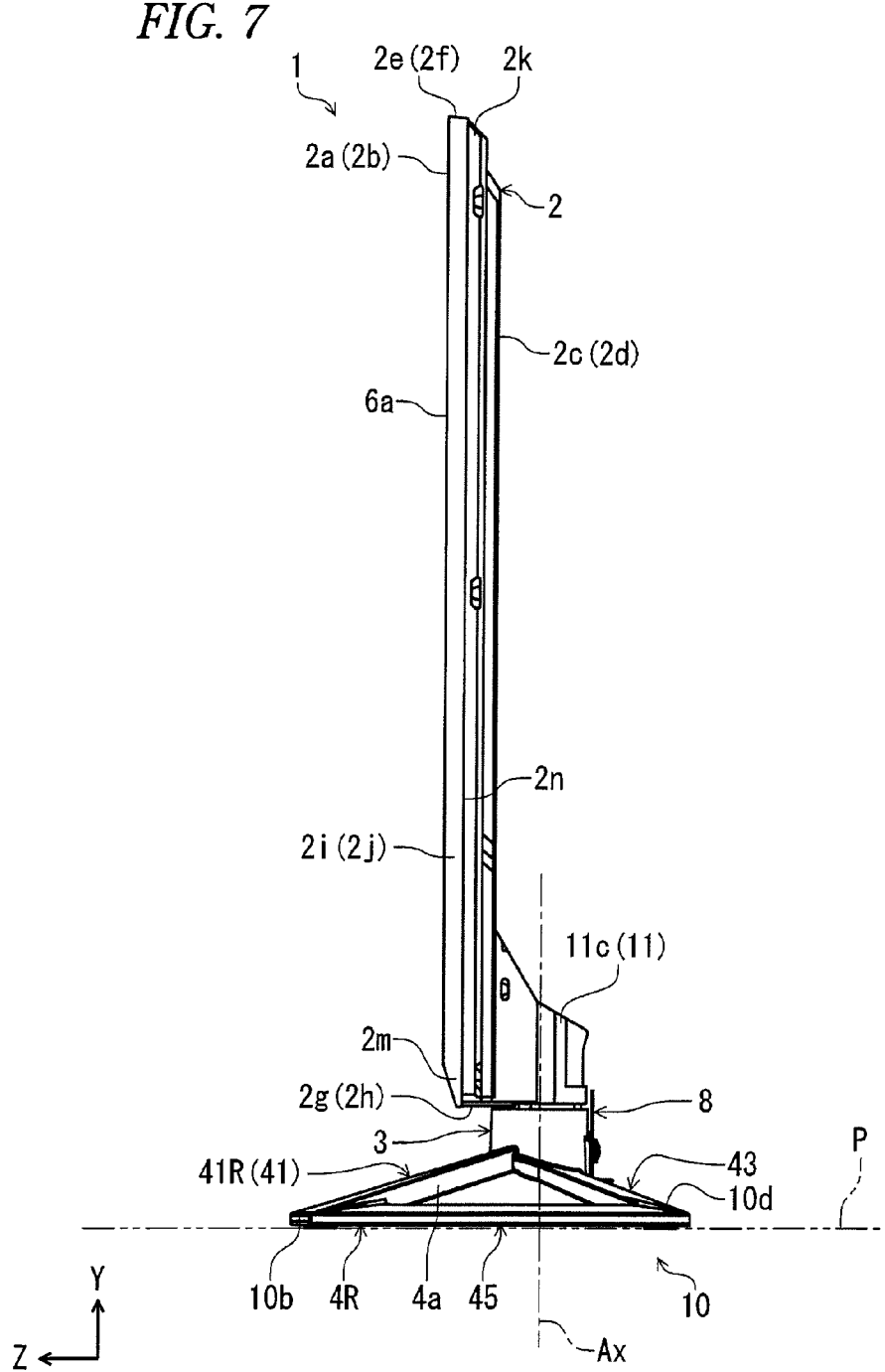
FIG. 7 is a side view of the video display apparatus.

As shown in FIGS. 1 to 9, a video display apparatus 1 as an example electronic apparatus is equipped with the case 2 and a stand 10. The case 2 is rotatably supported by the stand 10. In the embodiment, as shown in FIG. 5, the case 2 can be rotated in a prescribed movable range (angular range) parallel with a XZ plane around a rotation axis Ax (see FIGS. 5 and 7) extending in the Y direction. FIGS. 1 to 9 show a state that the case 2 is located at the center in its movable range.

The case 2 has a rectangular appearance (long in the X direction and short in the Y direction) when viewed from the front side (from Z direction) facing a front face 2a of the case 2 and a display screen 6a. The case 2 has a rectangular parallelepiped shape that is relatively thin in the front-rear direction (Z direction). The case 2 has a front wall 2b having the front face 2a, a rear wall 3d having a rear face 2c, a top wall 2f having a top face 2e, a bottom wall 2h having a bottom face 2g, and right and left side walls 2j having side faces 2i.

The front wall 2b and the rear wall 2d are spaced from each other and are parallel with each other. The front wall 2b has a rectangular opening (first opening; long in the X direction and short in the Y direction) 2r. The top wall 2f, the bottom wall 2h, and the side walls 2j connect the front wall 2b and the rear wall 2d and are perpendicular to (erect with respect to) front wall 2b and the rear wall 2d. The front wall 2b, the rear wall 2d, the top wall 2f, and the bottom wall 2h are examples of a wall portion. The front wall 2b is an example of a first wall portion, the rear wall 2d is an example of a second wall portion, and the bottom wall 2h is an example of a third wall portion.

Figure 1:
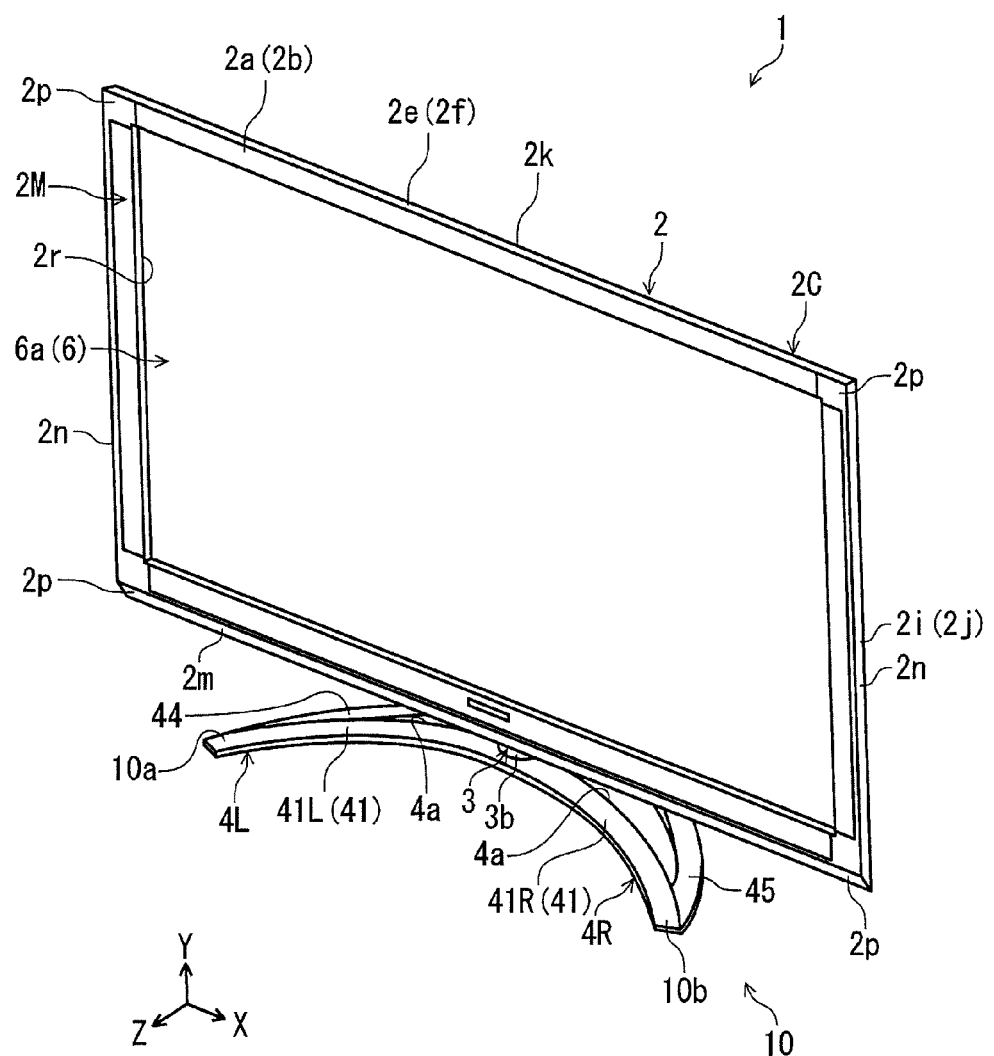
FIG. 1 is a perspective view, as viewed obliquely from the front side, of a video display apparatus according to an embodiment.
Figure 2:
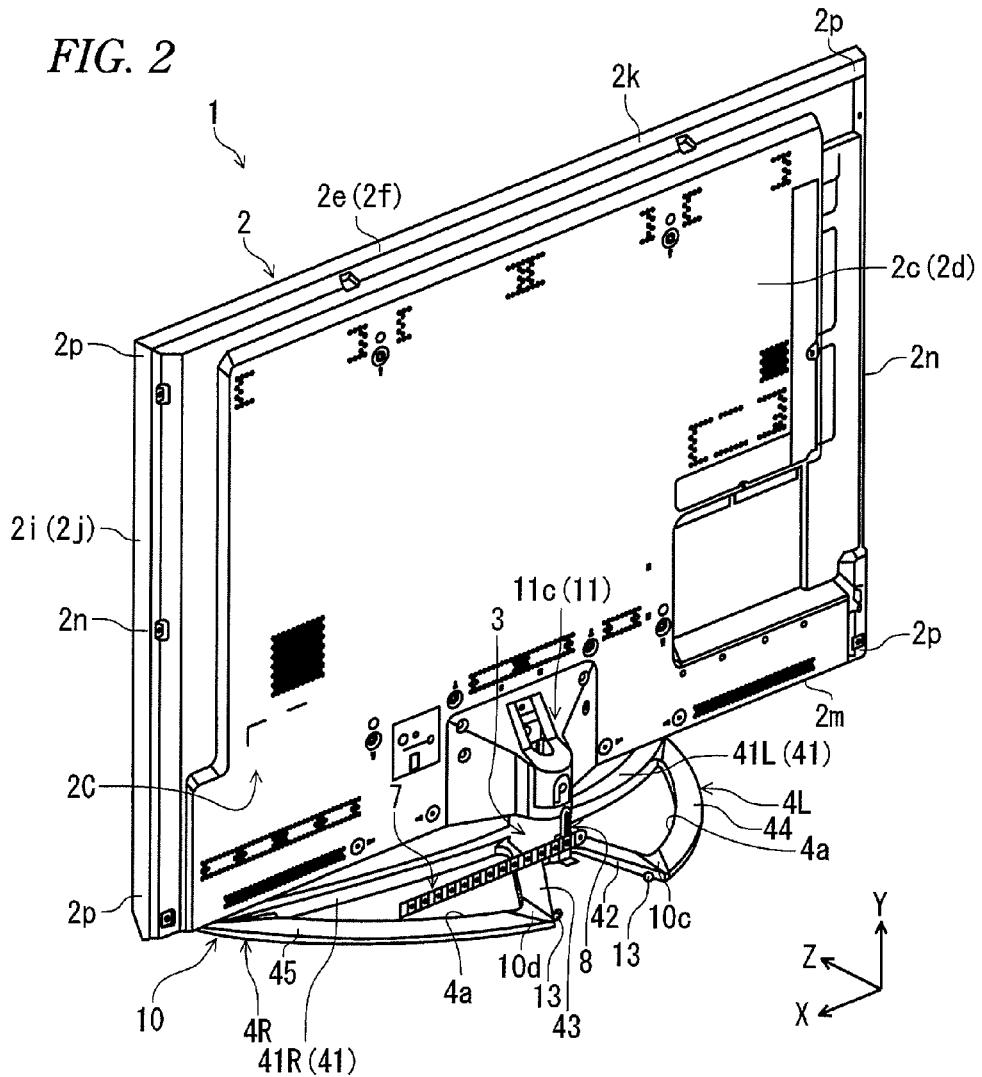
FIG. 2 is a perspective view, as viewed obliquely from the rear side, of the video display apparatus.

For example, as shown in FIGS. 1, 2, etc., the case 2 is formed by assembling divisional members such as a front mask (first member) 2M which is located on the side of the front face 2a and a back cover (second member) 2C which is located on the side of the rear face 2c. For example, the case 2 is made of a synthetic resin material, a metal material, or a combination thereof.

The case 2 has a top end portion 2k, a bottom end portion 2m, side end portions 2n, and four corner portions 2p. The front face 2a, the rear face 2c, the top face 2e, the bottom face 2g and the side faces 2i are examples of a face portion.

Figure 8:
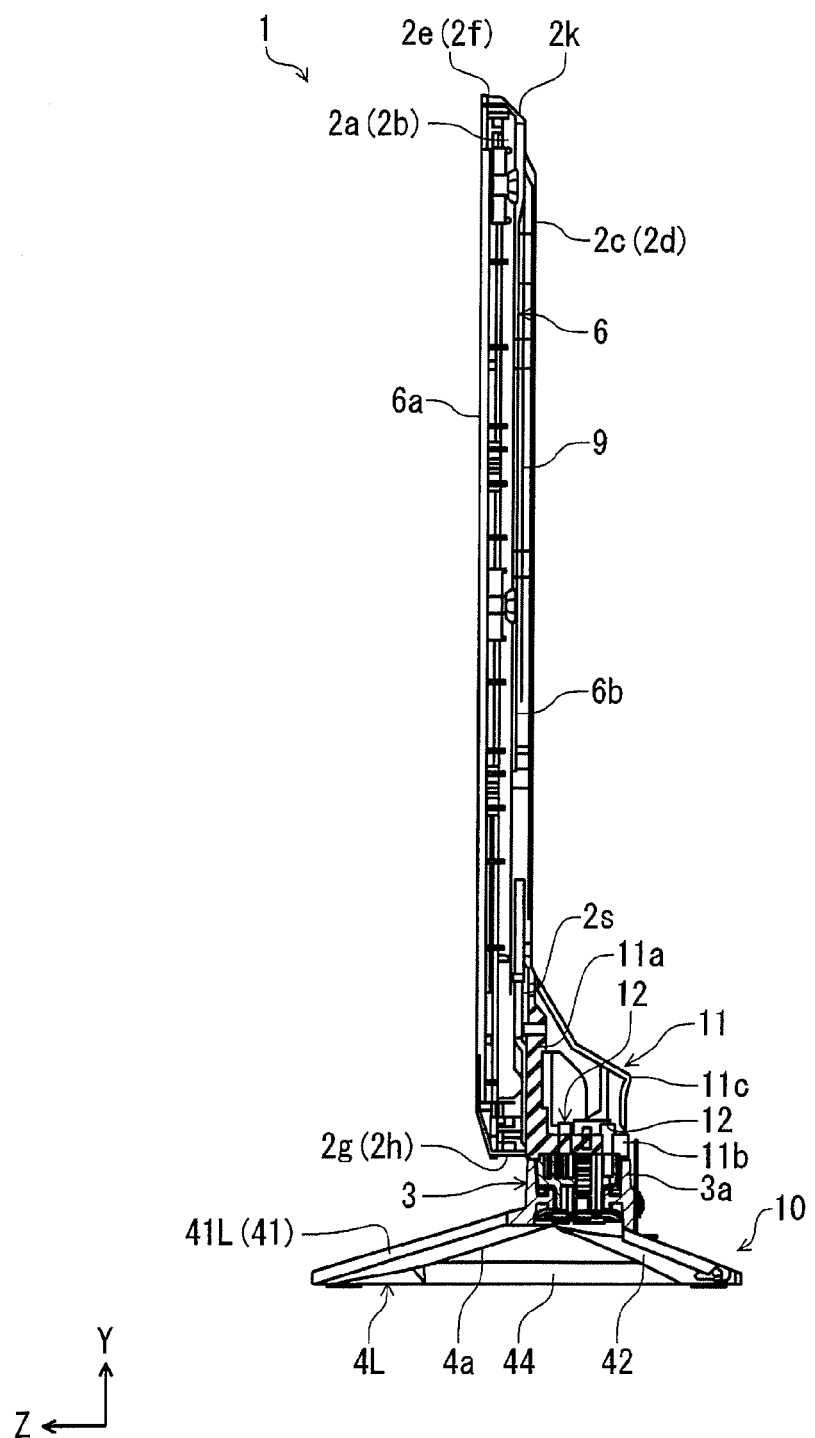
FIG. 8 is a sectional view taken along line VIII-VIII in FIG. 3.

As shown in FIGS. 2, 8, etc., the rear face 2c (rear wall 2d) of the case 2 is provided with a connection portion (projection portion) 11 to be attached to the stand 10 at, for example, a bottom-center (in the right-left direction) position of the rear face 2c. For example, as shown in FIG. 8, the connection portion 11 has a base portion 11a which is attached to a support portion (frame portion) 2s of the case 2, an attachment portion 11b which projects from the base portion 11a and through which through-holes 11d are formed, and a cover portion 11c with which the base portion 11a and the attachment portion 11b are covered. The attachment portion 11b is attached to a movable portion 3a of a rotation support portion (movement support portion, connection portion) 3 with connection members 12 such as screws. The cover portion 11c is attached after the attachment portion 11b is connected to the movable portion (rotary portion, support subject portion, fitting portion) 3a (i.e., after the case 2 (display device 6) is connected to the rotation support portion 3 (stand 10)).

As shown in FIG. 8 etc., the display device (display unit, display module) 6 is housed in the case 2. That is, the display device 6 is disposed between the front wall 2b and the read wall 2d and interposed between the side walls 2j. The display device 6 has a rectangular appearance (long in the X direction and short in the Y direction) when viewed from the front side, and has a rectangular parallelepiped shape that is relatively thin in the front-rear direction (Z direction). Part of the front face of the display device 6 is the display screen 6a which is rectangular (long in the X direction and short in the Y direction) when viewed from the front side. The display screen 6a is exposed to the front side through the opening 2r of the front wall 2b (front face 2a) of the case 2. The display device 6 has a rear face 6b which is opposite to the display screen 6a. For example, the display device 6 is such a panel (panel unit) as a liquid crystal display (LCD) or an organic electroluminescent display (OELD).

A circuit board (board, control board, printed circuit board) 9 is housed in the case 2. For example, the circuit board 9 is fixed to (attached to) the rear face 6b of the display device 6 with connection members (not shown) such as screws. The rear face 6b is formed with bosses (projections, screwing portions; not shown), and the circuit board 9 is attached to the bosses with the connection members (not shown) such as screws. The circuit board 9 is mounted with various components such as electronic components and electric components which may form a video processing circuit, an input signal processing circuit, a frame rate converter (FRC) circuit, a timing control (Tcon) circuit, a driver circuit, a control circuit, etc. (not shown). A storage device (storage unit, storage module) such as a hard disk drive (HDD) or a solid-state drive (SSD), a fan unit (fan device, cooling unit, cooling component), a power circuit (power device, power unit), etc. (not shown) may be mounted on the circuit board 9 or the rear face 6a.

For example, as shown in FIGS. 10 to 21 etc., the stand 10 has two support portions 4L and 4R and the rotation support portion 3 which is supported by the two support portions 4L and 4R and supports the case 2 rotatably. The rotation support portion 3 is an example connection portion that is interposed between the case 2 and the support portions 4L and 4R. For example, the stand 10 is made of a metal material (e.g., aluminum alloy). The stand 10 can be formed by casting (e.g., aluminum die casting) except the movable portion 3a, components attached, etc.

The support portion 4L, which is disposed on the left-hand side when viewed from the front side. The support portion 4L has a first portion 41L, a second portion 42 which extends obliquely downward from the rotation support portion 3 which has a cylindrical shape, and a bridge portion 44 which connects the first portion 41L and the second portion 42. The first portion 41L and the second portion 42 are example raised portions.

The first portion (front support portion, front portion, first leg) 41L has an approximately rectangular cross section and extends from a proximal portion (top portion) 41La which is connected to a front end portion 3b located on the front side of the center (center of gravity; located on the rotation axis Ax) of the rotation support portion 3 to a tip portion (lower end portion) 41Lb which is located at a front-left (as viewed from the front side (see FIGS. 3 and 12)), lowest position. The first portion 41L has a circular arc shape (curved shape). The tip portion 41Lb is connected to an end portion (outward end portion) 44a of the bridge portion 44. For example, the first portion 41L is solid.

The second portion (rear support portion, rear portion, second leg) 42 has an approximately rectangular cross section and extends from a proximal portion (top portion) 42a which is connected to a side end portion 3c of the rotation support portion 3 to a tip portion (lower end portion) 42b which is located at a rear-left (as viewed from the front side), lowest position. The tip portion 42b is connected to an end portion (inward end portion) 44b of the bridge portion 44. For example, the second portion 42 is solid.

The bridge portion 44 extends between and connects the tip portion 41Lb of the first portion 41L and the tip portion 42b of the second portion 42, and is a bottom portion of the support potion 4L. The bridge portion 44 has a circular arc shape (curved shape) between its end portions 44a and 44b. That is, the bridge portion 44 is bent in a circular arc shape. In the embodiment, as shown in FIGS. 10, 11, 14, 15, etc., the bridge portion 44 is bent so as to be convex toward the side that is opposite to the rotation support portion 3 (i.e., the center of gravity of the case 2). As shown in FIG. 15 etc., a back face 44c of the bridge portion 44 is formed with plural recesses 44d, whereby a truss structure (a series of triangles) is formed between the end portions 44a and 44b. The truss structure attains necessary rigidity and strength with a lighter weight. A honeycomb structure (a series of (densely arranged) hexagons) may be used instead of the truss structure. For example, the bridge portion 44 is solid.

The support portion 4R is face-symmetrical with the support portion 4L with respect to the YZ plane C (see FIG. 14) that passes through the center of the display screen 6a. That is, the support portion 4R and the support portion 4L are in a mirror image relationship. The first portion 41R and the second portion 43 are example raised portions.

That is, the support portion 4R, which is disposed on the right-hand side when viewed from the front side, has a first portion 41R, a second portion 43 which extends obliquely downward from the rotation support portion 3 which has a cylindrical shape, and a bridge portion 45 which connects the first portion 41R and the second portion 43.

The first portion (front support portion, front portion, first leg) 41R has an approximately rectangular cross section and extends from a proximal portion (top portion) 41Ra which is connected to the front end portion 3b located on the front side of the center (center of gravity; located on the rotation axis Ax) of the rotation support portion 3 to a tip portion (lower end portion) 41Rb which is located at a front-left (as viewed from the front side (see FIGS. 3 and 12)), lowest position. The first portion 41R has a circular arc shape (curved shape). The tip portion 41Rb is connected to an end portion (outward end portion) 45a of the bridge portion 45. For example, the first portion 41R is solid.

The second portion (rear support portion, rear portion, second leg) 43 has an approximately rectangular cross section and extends from a proximal portion (top portion) 43a which is connected to a side end portion 3c of the rotation support portion 3 to a tip portion (lower end portion) 43b which is located at a rear-right (as viewed from the front side), lowest position. The tip portion 43b is connected to an end portion (inward end portion) 45b of the bridge portion 45. For example, the second portion 43 is solid.

The bridge portion 45 extends between and connects the tip portion 41Rb of the first portion 41R and the tip portion 43b of the second portion 43, and is a bottom portion of the support potion 4R. The bridge portion 45 has a circular arc shape (curved shape) between its end portions 45a and 45b. That is, the bridge portion 45 is bent in a circular arc shape. In the embodiment, as shown in FIGS. 10, 11, 14, 15, etc., the bridge portion 45 is bent so as to be convex toward the side that is opposite to the rotation support portion 3 (i.e., the center of gravity of the case 2). A back face 45c of the bridge portion 45 is formed with plural recesses 45d, whereby a truss structure (a series of triangles) is formed between the end portions 45a and 45b. The truss structure attains necessary rigidity and strength with a lighter weight. A honeycomb structure (a series of (densely arranged) hexagons) may be used instead of the truss structure. For example, the bridge portion 45 is solid.

Figure 10:
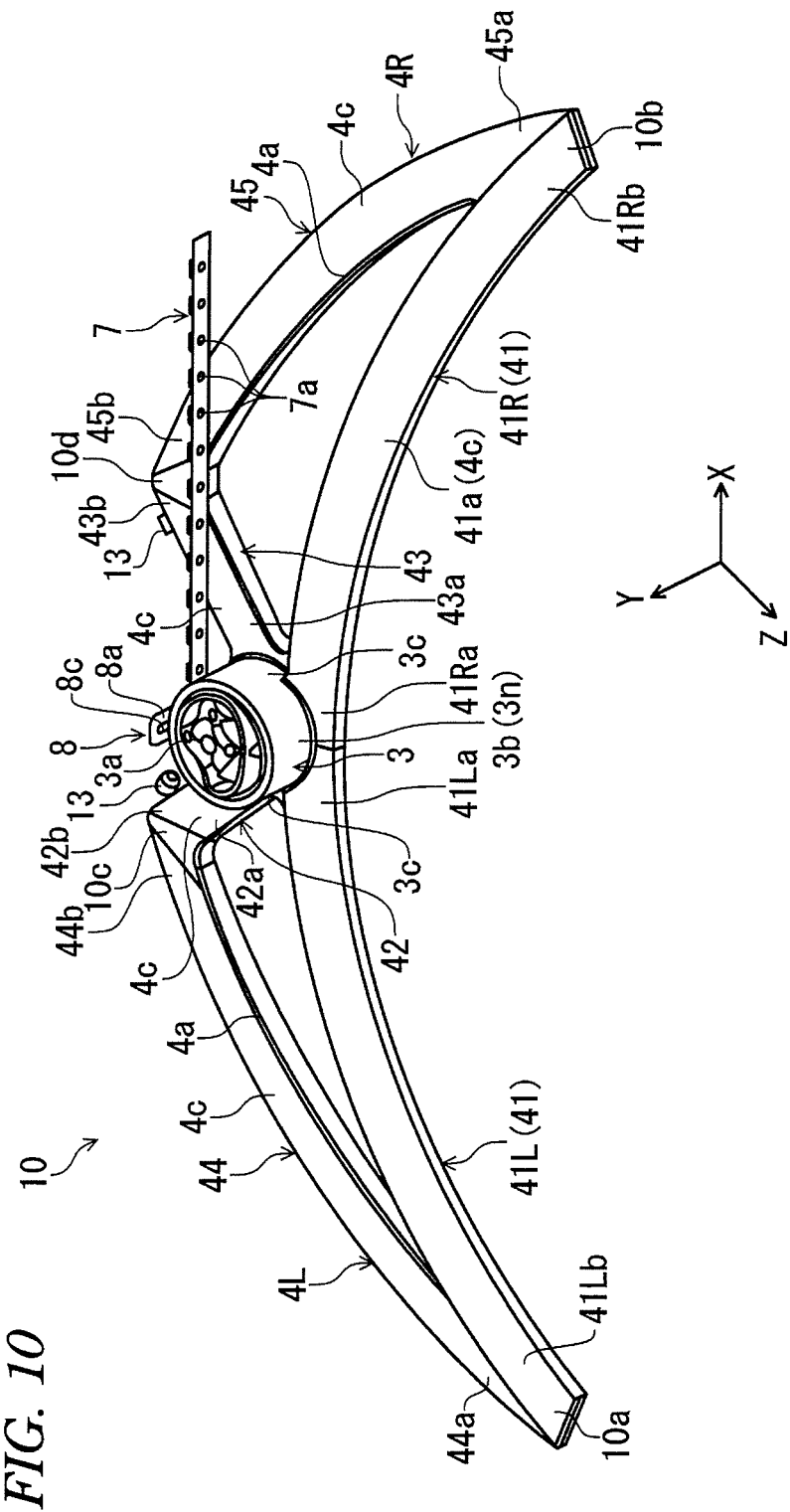
FIG. 10 is a perspective view, as viewed obliquely from the front side, of an example stand included in the video display apparatus according to the embodiment.
Figure 11:
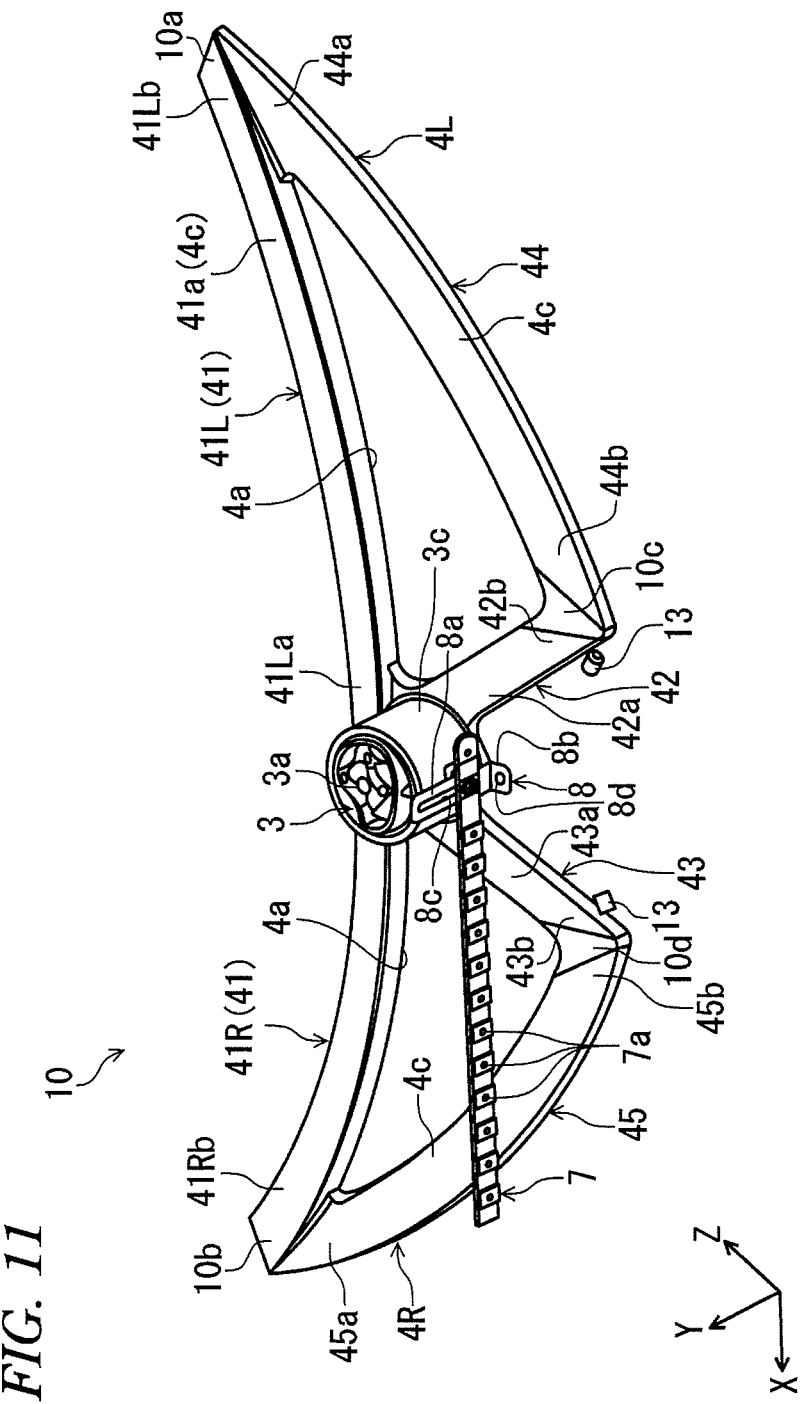
FIG. 11 is a perspective view, as viewed obliquely from the rear side, of the example stand.
Figure 14:
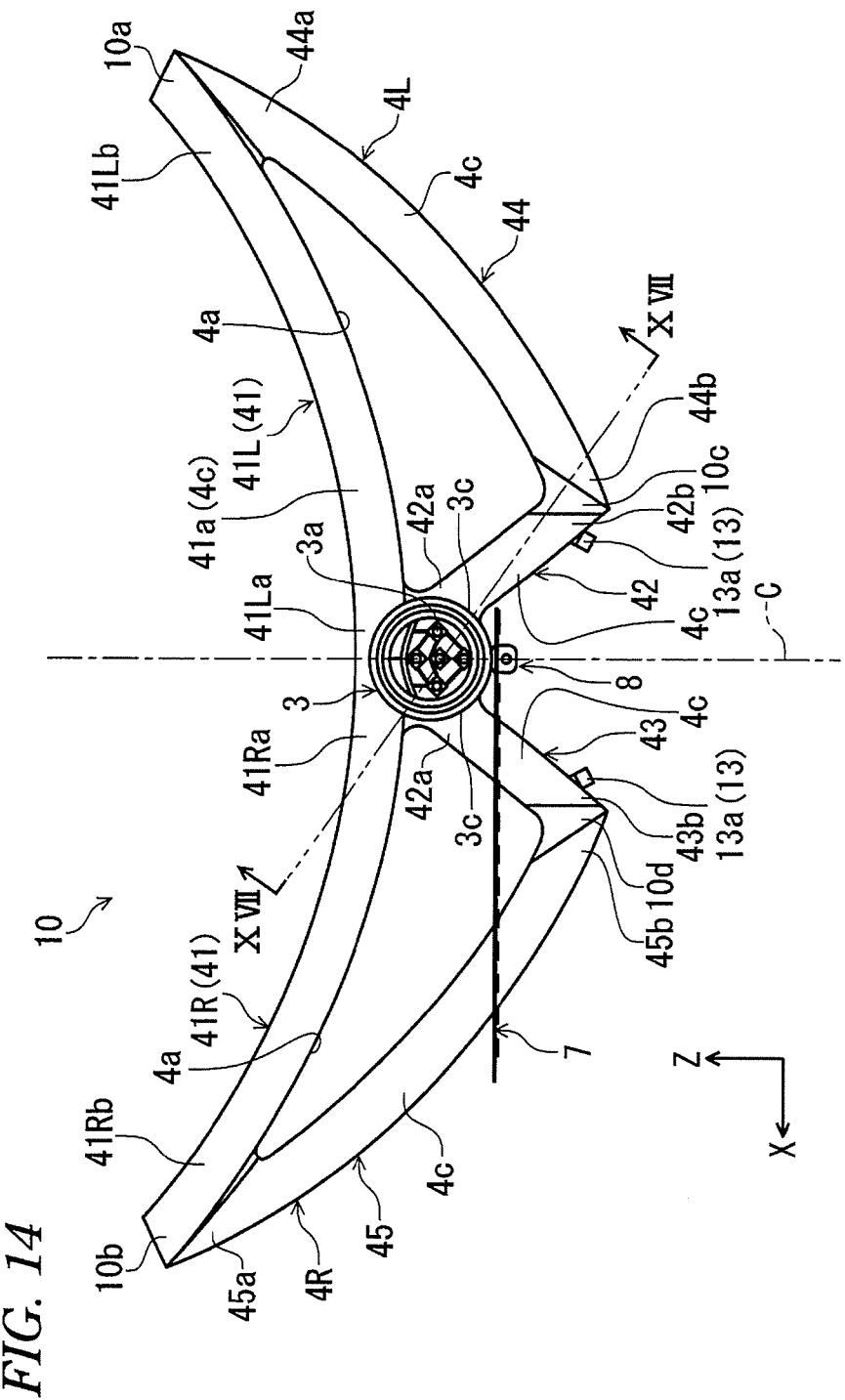
FIG. 14 is a top view of the example stand.
Figure 15:
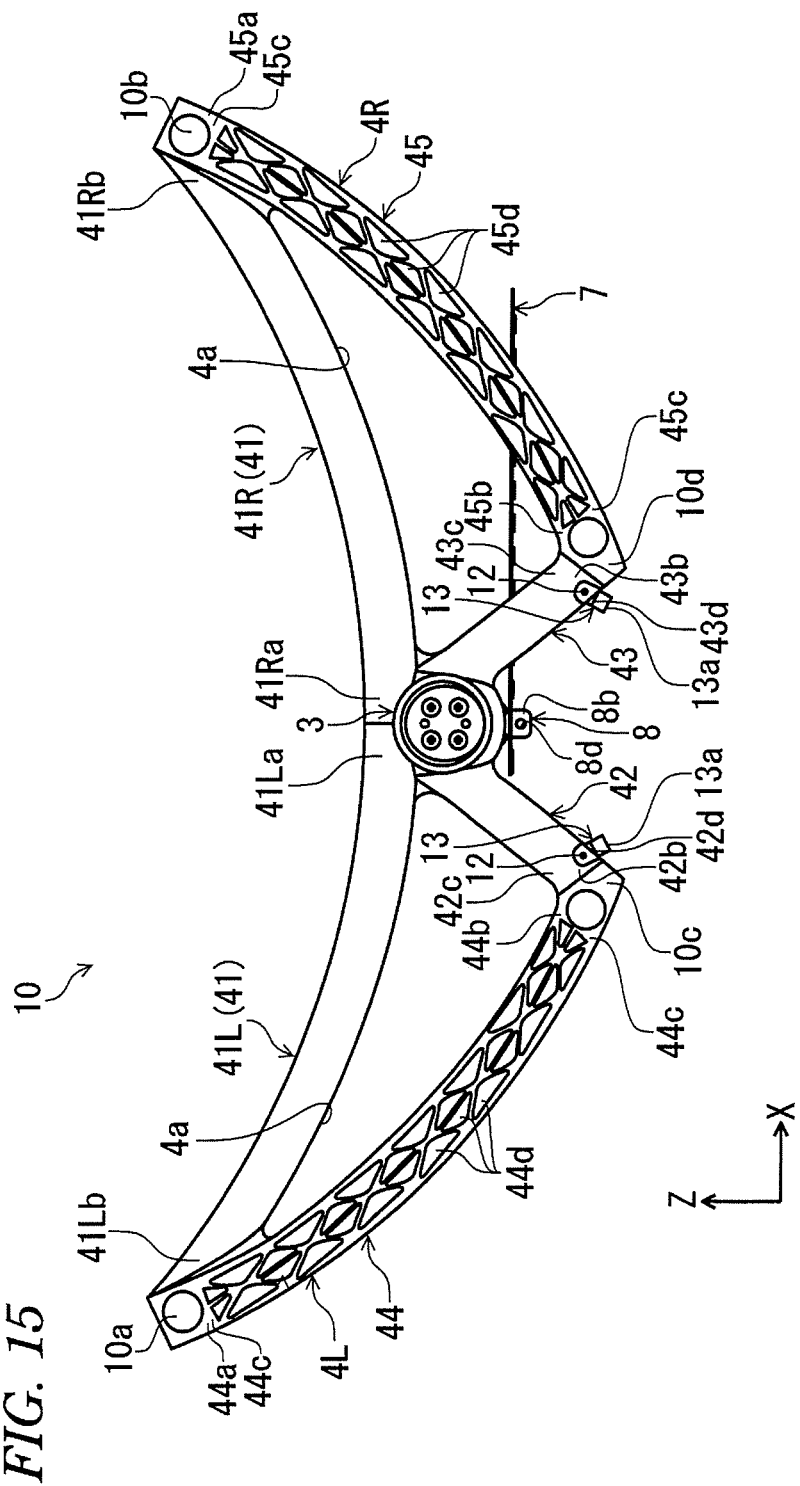
FIG. 15 is a bottom view of the example stand.

As shown in FIGS. 10, 14, 15, etc., in the embodiment, the proximal portion 41La of the first portion 41L of the support portion 4L and the proximal portion 41Ra of the first portion 41R of the support portion 4R are in contact with each other so as to form a smooth shape (the proximal portions 41La and 41Ra are connected to the front end portion 3b of the rotation support portion 3). For example, the proximal portion 41La of the first portion 41L and the proximal portion 41Ra of the first portion 41R share tangential lines. Furthermore, in the embodiment, for example, the first portions 41L and 41R have the same radius of curvature. That is, in the embodiment, the first portions 41L and 41R together form a circular-arc-shaped leg (front leg, first leg, foot, arm, raised portion) 41.

Figure 12:
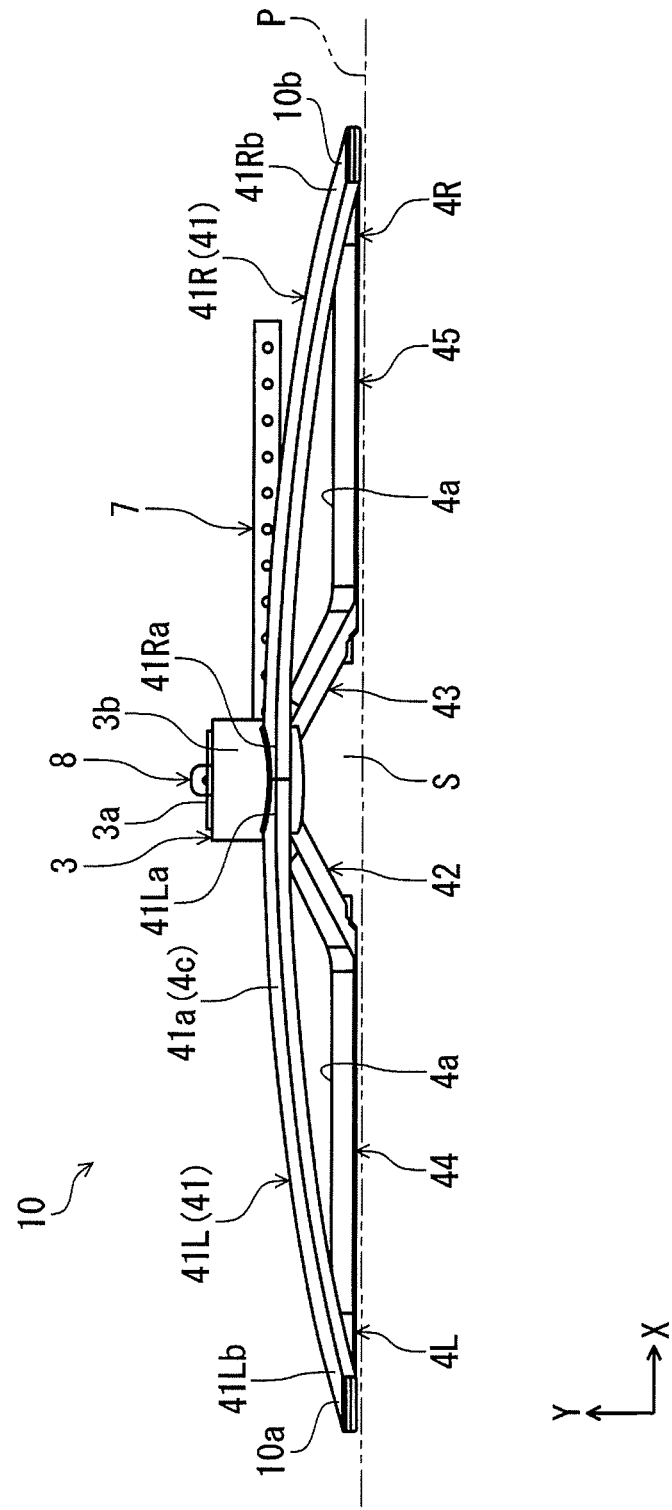
FIG. 12 is a front view of the example stand.
Figure 16:
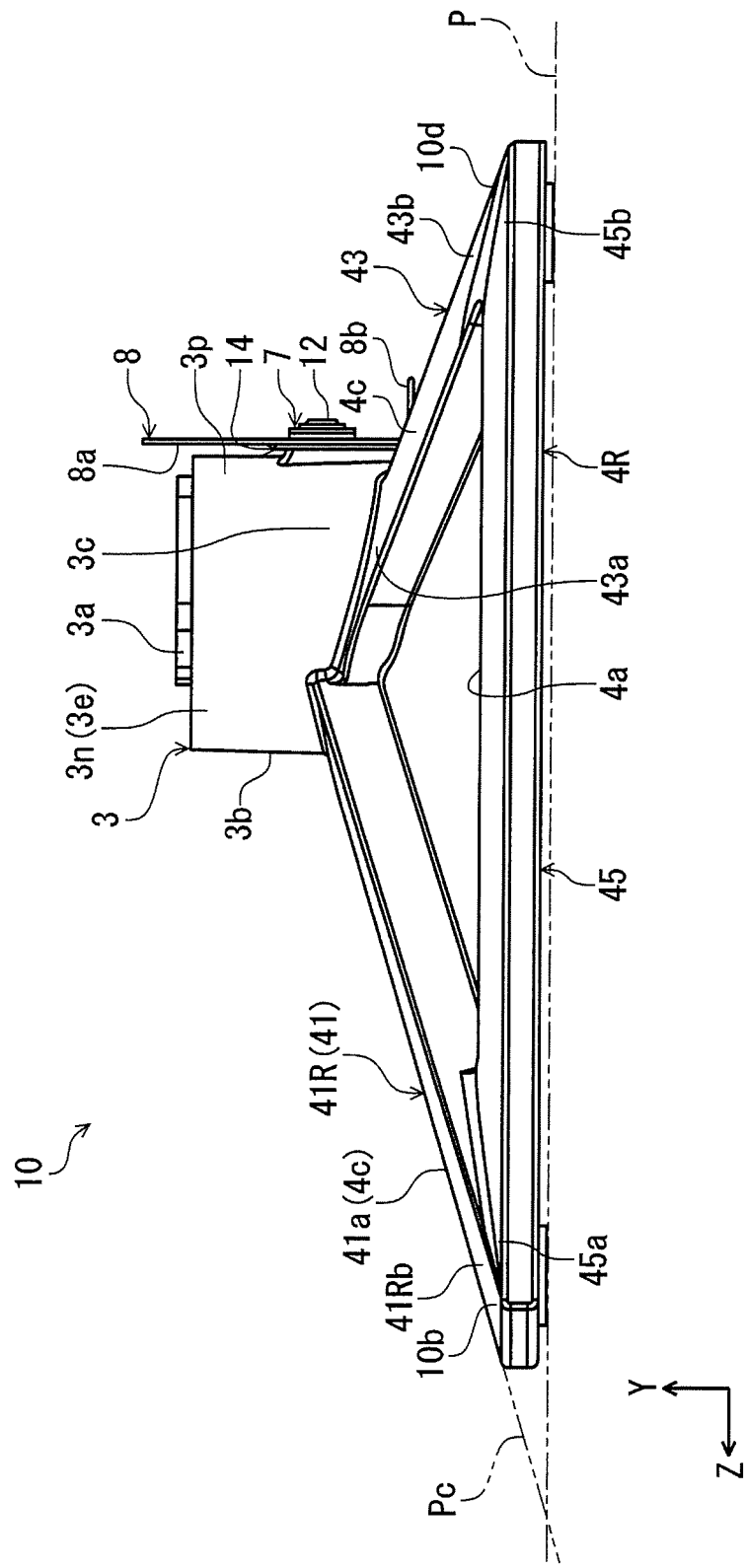
FIG. 16 is a side view of the example stand.

As shown in FIG. 12 etc., the leg 41 is raised in a circular arch shape. More specifically, the leg 41 is raised upward in a circular arch shape in which the tip portions 41Lb and 42Lb are bottom portions (side end portions) and the proximal portions 41La and 41Ra are top portions (central portions). That is, as shown in FIG. 16, the leg 41 is in a plane Pc that is obtained by rotating the XY plane (counterclockwise in FIG. 16) about the X-axis direction by a prescribed angle. In the embodiment, a top face 41a of the leg 41 (first portions 41L and 41R) is in the plane Pc.

In the stand 10 having the above-configured support portions 4L and 4R, at least four end portions 10a, 10b, 10c, and 10d serve as placement points (contact points, support points) that are in contact with a plane P (installation face). As shown in FIG. 5, the end portion (placement point) 10a is in a region (top-left region in FIG. 5, first region) A1 that is located on the front side and the left side (as viewed from the front side) of the center of gravity G of the case 2. The end portion (placement point) 10b is in a region (bottom-left region in FIG. 5, first region) A2 that is located on the front side and the right side (as viewed from the front side) of the center of gravity G of the case 2. The end portion (placement point) 10c is in a region (top-right region in FIG. 5, second region) A3 that is located on the rear side and the left side (as viewed from the front side) of the center of gravity G of the case 2. The end portion (placement point) 10d is in a region (bottom-right region in FIG. 5, second region) A4 that is located on the rear side and the right side (as viewed from the front side) of the center of gravity G of the case 2. As such, the stand 10 can support the case 2 more stably from all of the front side, rear side, the right side, and the left side.

Furthermore, in the embodiment, as shown in FIGS. 14, 15, etc., the bridge portions 44 and 45 are bent so as to be convex toward the side that is opposite to the center of gravity of the case 2. Therefore, the stand 10 can support the case 2 in the bulging directions of the bridge portions 44 and 45 more stably than in a case that the bridge portions 44 and 45 are not curved.

Figure 17:
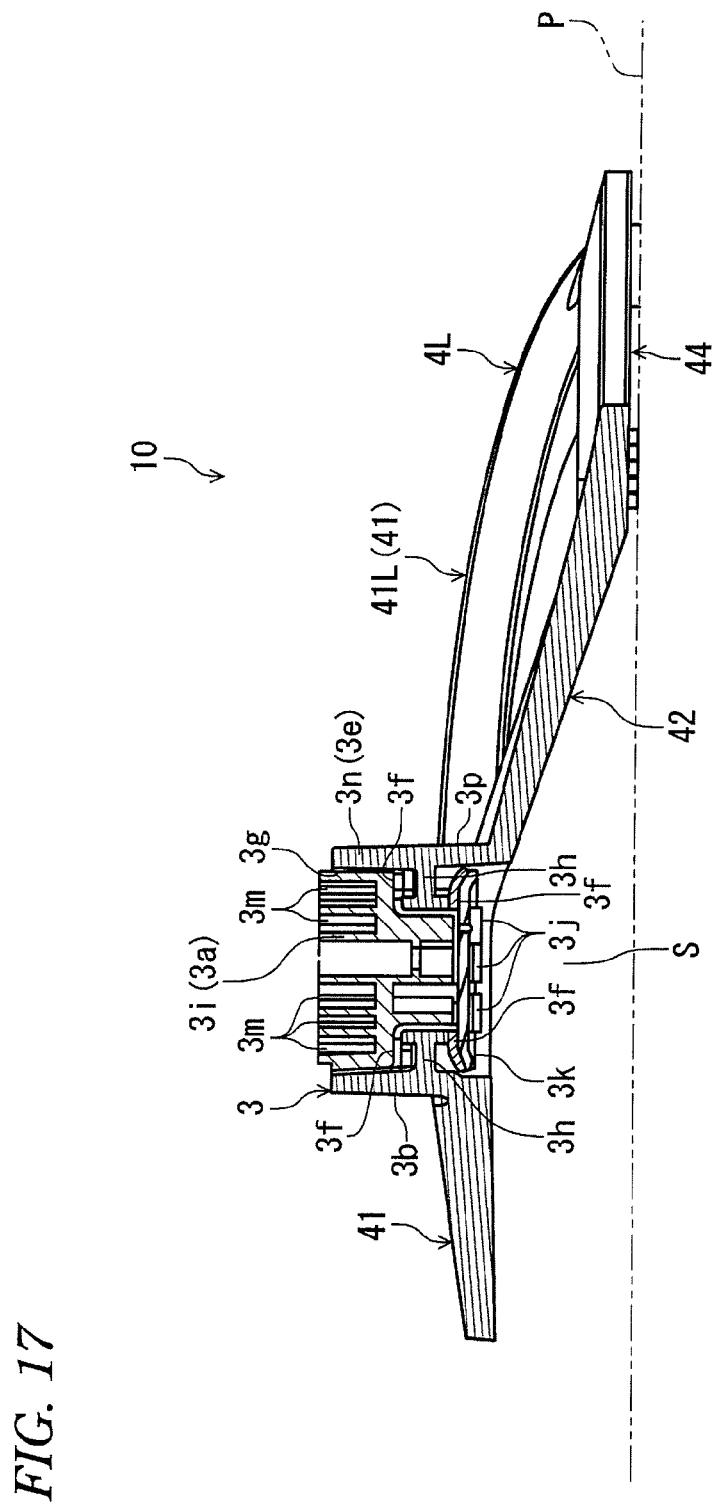
FIG. 17 is a sectional view taken along line XVII-XVII in FIG. 14.

As shown in FIGS. 12, 17, etc., the support portion 4L has the bridge portion 44 which crosses the boundary between the first region A1 and the second region A3 and the first portion 41L and the second portion 42 (raised portions) which are provided with an opening (second opening) 4a which is defined by the first portion 41L, the second portion 42, and the top portion of the bridge portion 44. The support portion 4L thus supports the rotation support portion 3 which is elevated from the plane P.

The support portion 4R has the bridge portion 45 which crosses the boundary between the first region A2 and the second region A4 and the first portion 41R and the second portion 43 (raised portions) which are provided with an opening (second opening) 4a which is defined by the first portion 41R, the second portion 43, and the top portion of the bridge portion 45. The support portion 4R thus supports the rotation support portion 3 which is elevated from the plane P. That is, a bottom portion of the rotation support portion 3 is higher, that is, closer to the case 2, than the bottom portions of the support portions 4L and 4R are.

As such, in the embodiment, the support portions 4L and 4R allow a space (gap) between the rotation support portion 3 and the plane P, that is, under the rotation support portion 3.

Figure 18:
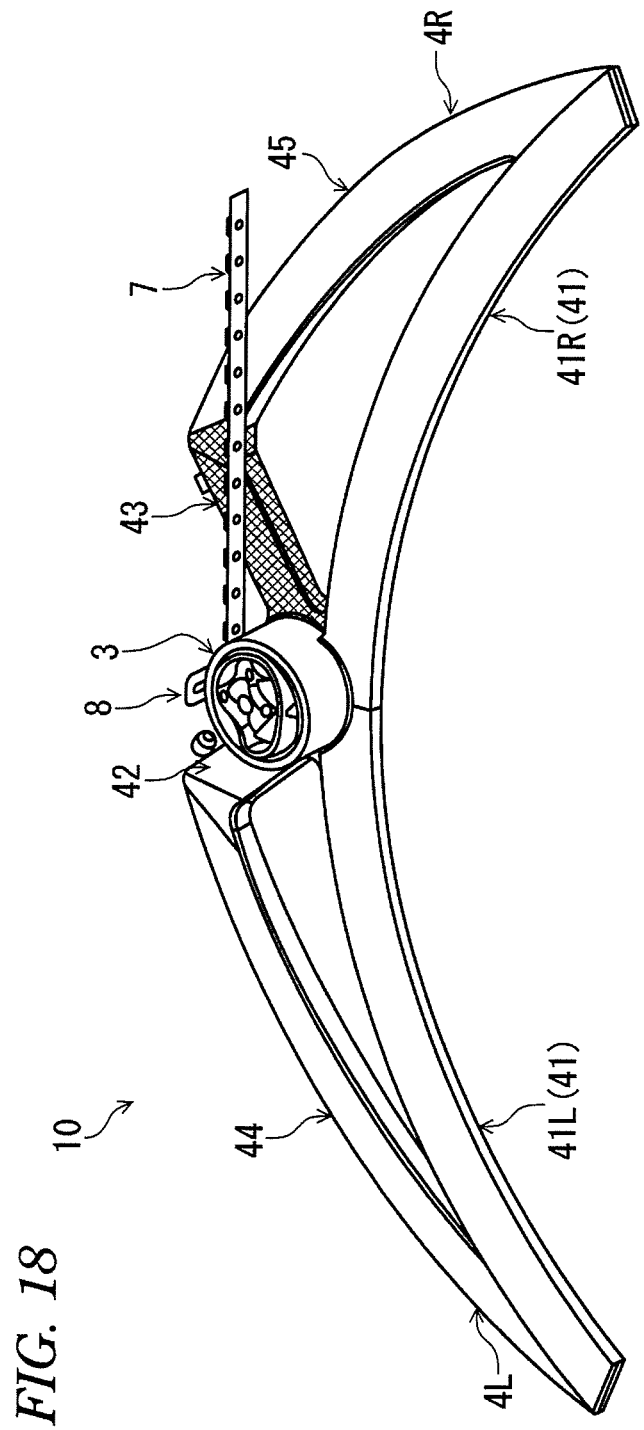
FIG. 18 is a perspective view, as viewed obliquely from the front side, of the example stand for description of the fact that the example stand works effectively even if one of a first portion and a second potion of support portions is unfunctional.
Figure 19:
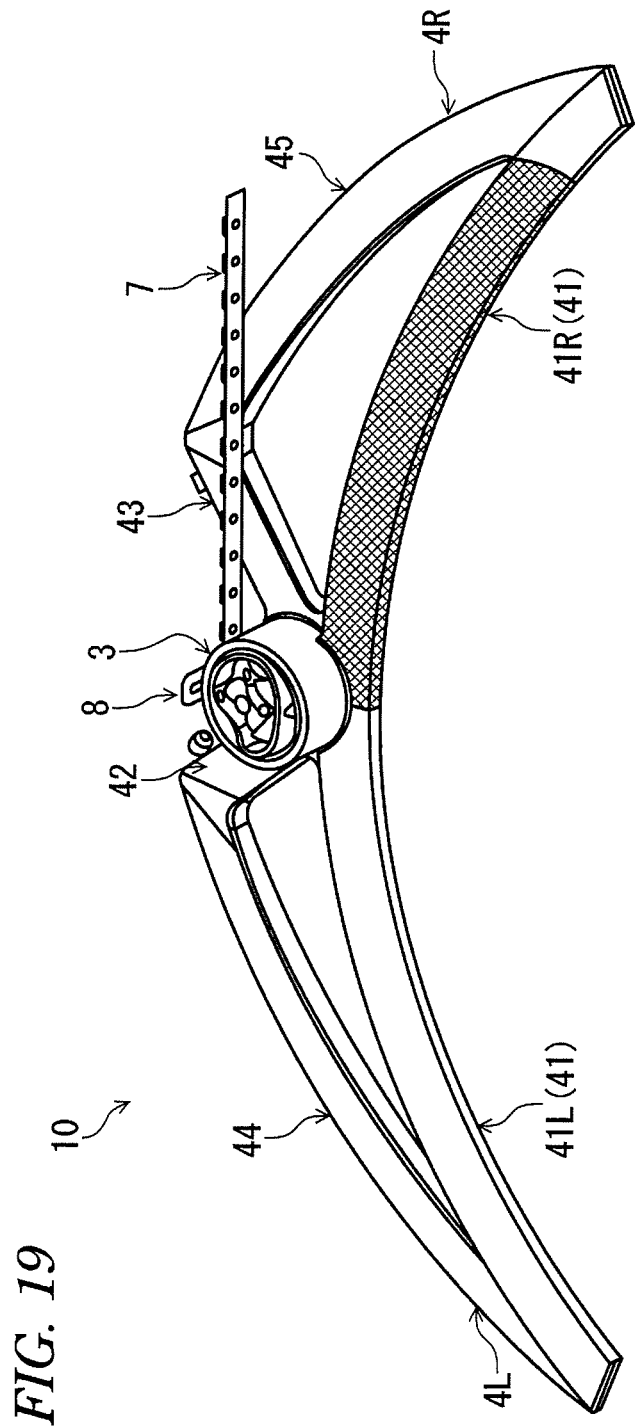
FIG. 19 is a perspective view, as viewed obliquely from the front side, of the example stand for description of the fact that the example stand works effectively even if the other one of the first potion and the second portion of the support portions is unfunctional.
Figure 20:
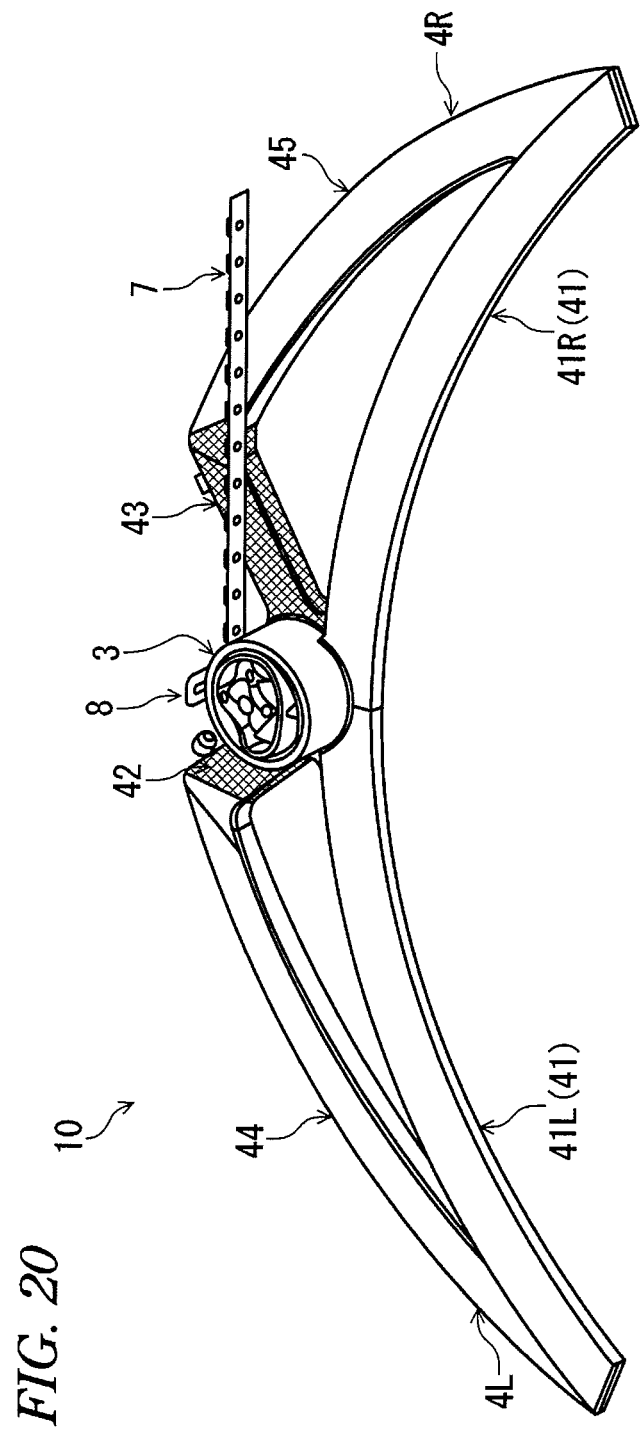
FIG. 20 is a perspective view, as viewed obliquely from the front side, of the example stand for description of the fact that the example stand works effectively even if rear-side two members of the first portion and the second potions of the support portion are unfunctional.
Figure 21:
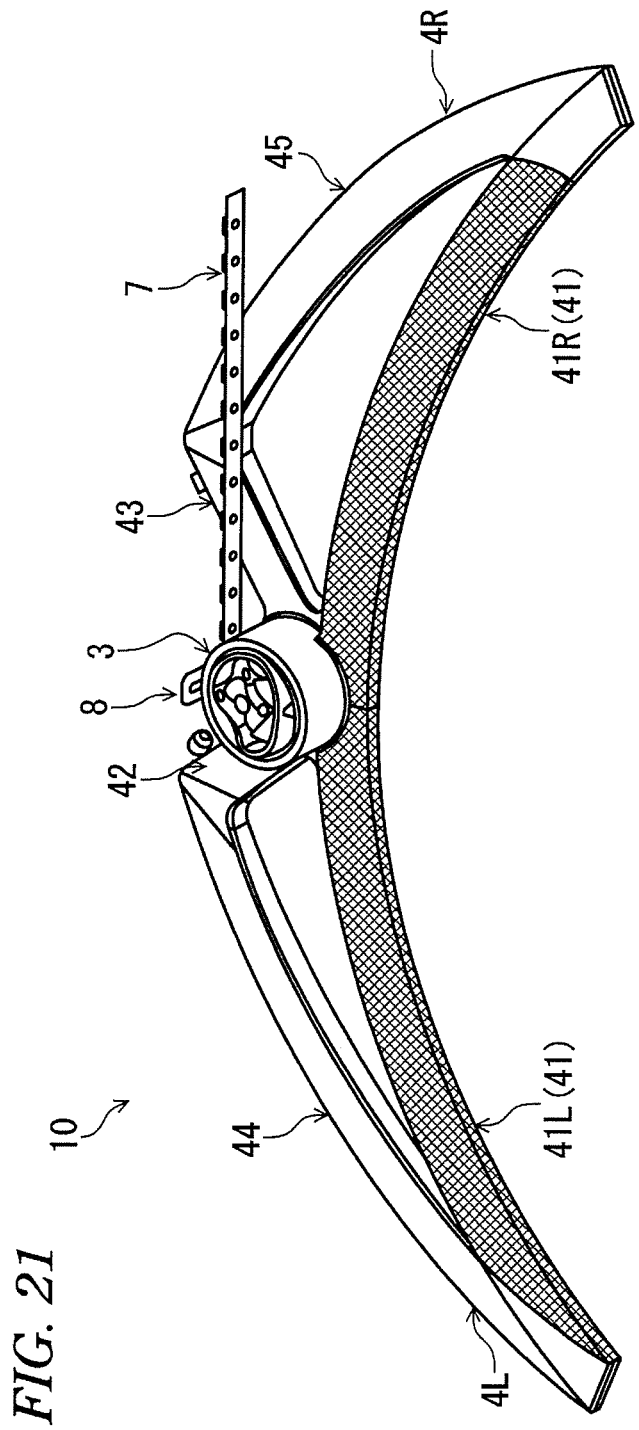
FIG. 21 is a perspective view, as viewed obliquely from the front side, of the example stand for description of the fact that the example stand works effectively even if front-side two members of the first portion and the second potions of the support portion are unfunctional.

In the stand 10 according to the embodiment, as shown in FIG. 18, the end portion 10d (placement point) is connected to the rotation support portion 3 by the bridge portion 45 and the first portion 41R even if the second portion 43 (crosshatched) is unfunctional. As shown in FIG. 19, the end portion 10b (placement point) is connected to the rotation support portion 3 by the bridge portion 45 and the second portion 43 even if the first portion 41R (crosshatched) is unfunctional. Whereas FIGS. 18 and 19 show the cases that the second portion 43 or the first portion 41R which is located on the right side (when viewed from the front side) is unfunctional, the same applies to the cases that the second portion 42 or the first portion 41L which is located on the left side (when viewed from the front side) is unfunctional In the stand 10 according to the embodiment, as shown in FIG. 20, the end portions 10c and 10d (placement points) are connected to the rotation support portion 3 by the bridge portion 44 and the first portion 41L and the bridge portion 45 and the first portion 41R, respectively, even if both of the second portions 42 and 43 (crosshatched) are unfunctional. As shown in FIG. 21, the end portions 10a and 10b (placement points) are connected to the rotation support portion 3 by the bridge portion 44 and the second portion 42 and the bridge portion 45 and the second portion 43, respectively, even if both of the first portions 41L and 41R (crosshatched) are unfunctional.

As described above, in the stand 10 according to the embodiment, even if one of the first portions 41L and 41R or one of the second portions 42 and 43 is unfunctional or even if both of the first portions 41L and 41R or both of the second portions 42 and 43 are unfunctional, the number of placement points remains the same as in the case where none of the first portions 41L and 41R and the second portions 42 and 43 are unfunctional as long as necessary rigidity is secured in the connection portions of the first portions 41L and 41R, the second portions 42 and 43, and the bridge portions 44 and 45. As such, the stand 10 according to the embodiment can support the case 2, that is, the video display apparatus 1, more stably.

In the embodiment, the openings 4a of the support portions 4L and 4R provide an advantage that the user can hold the stand 10 easily in carrying the video display apparatus 1. Furthermore, the stand 10 can be made lighter than in a case that the openings 4a are not formed. Still further, since the total area of top faces 4c of the stand 10 is reduced, the degree of light reflection by the top faces 4c can be lowered. In addition, the amount of dust etc. gathered on the stand 10 can be reduced.

Figure 3:
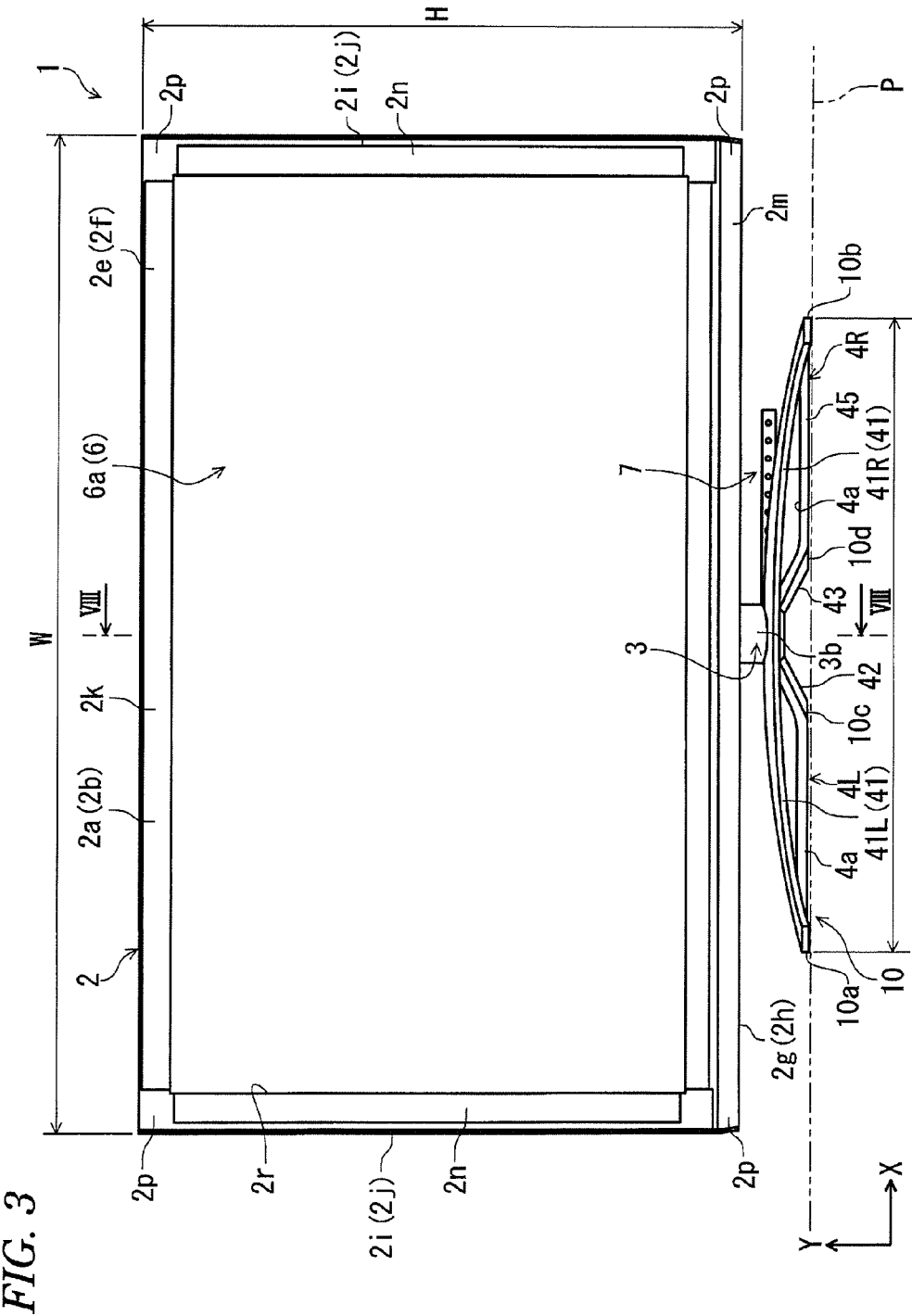
FIG. 3 is a front view of the video display apparatus.
Figure 4:
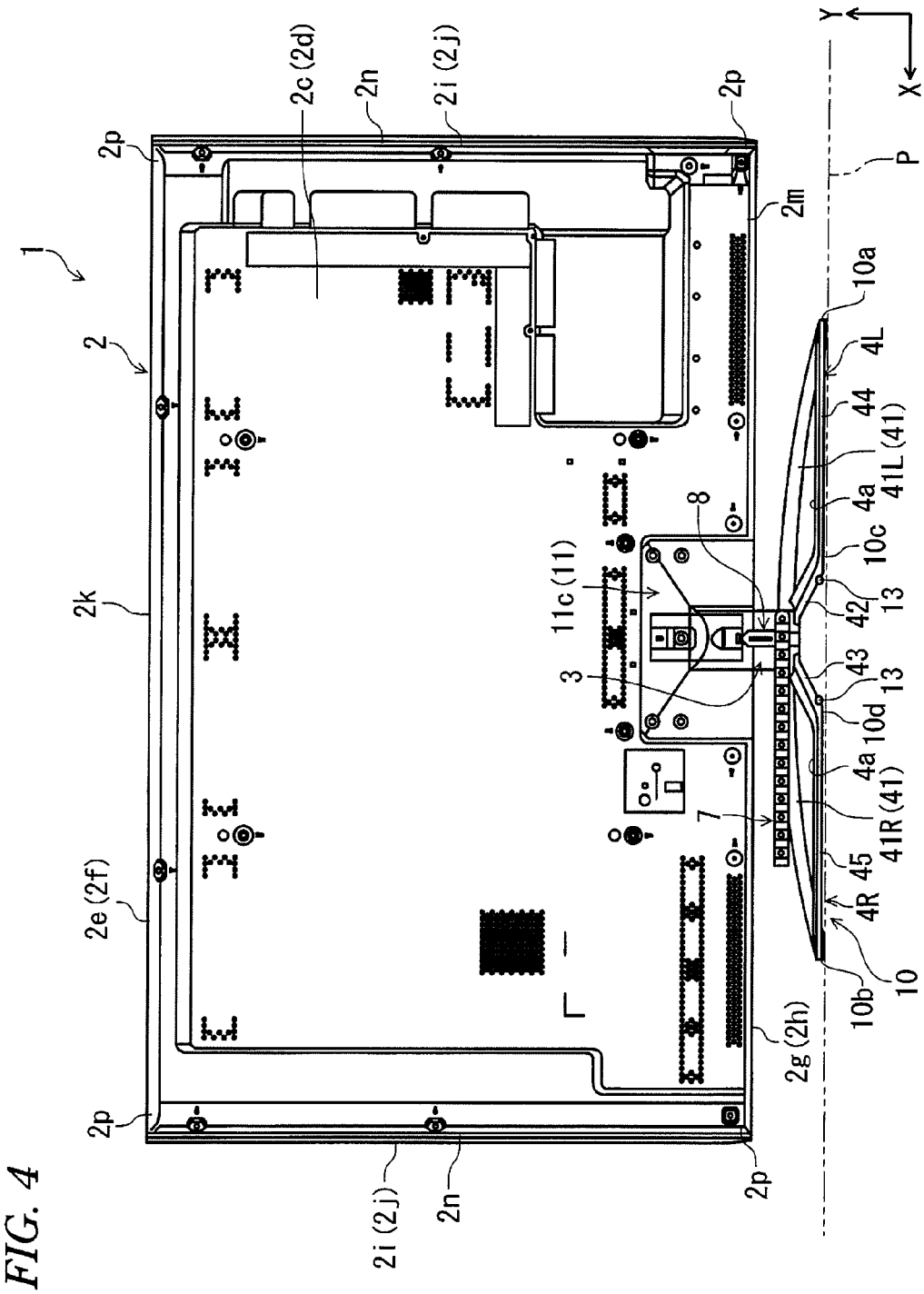
FIG. 4 is a rear view of the video display apparatus.

In the embodiment, as shown in FIGS. 3, 12, etc., since the stand 10 puts the bottom portion of the rotation support portion (connection portion) 3 higher (i.e., closer to the case 2) than the bottom portions of the support portions 4L and 4R are, the bottom portion of the rotation support portion 3 is not in contact with the plane P and a space (gap) is formed under the rotation support portion 3. The rotation support portion 3 is thus supported by the stand 10 in an elevated state. This provides an advantage that the movable portion including the case 2 which is supported by the rotation support portion 3 is less prone to shake because the mass of the movable portion and the length of the moment arm from the supporting point of the rotation support portion 3 can be made smaller or shorter than in a case that the rotation support portion 3 located at a lower position. For example, the space S can be used as a place where a remote controller, components, goods such as packages of discs such as compact discs (CDs) and digital versatile discs (DVDs), and other things are placed. There is another advantage that the formation of the space S facilitates cleaning of its neighborhood, the back side of the case 2, etc.

Figure 9:
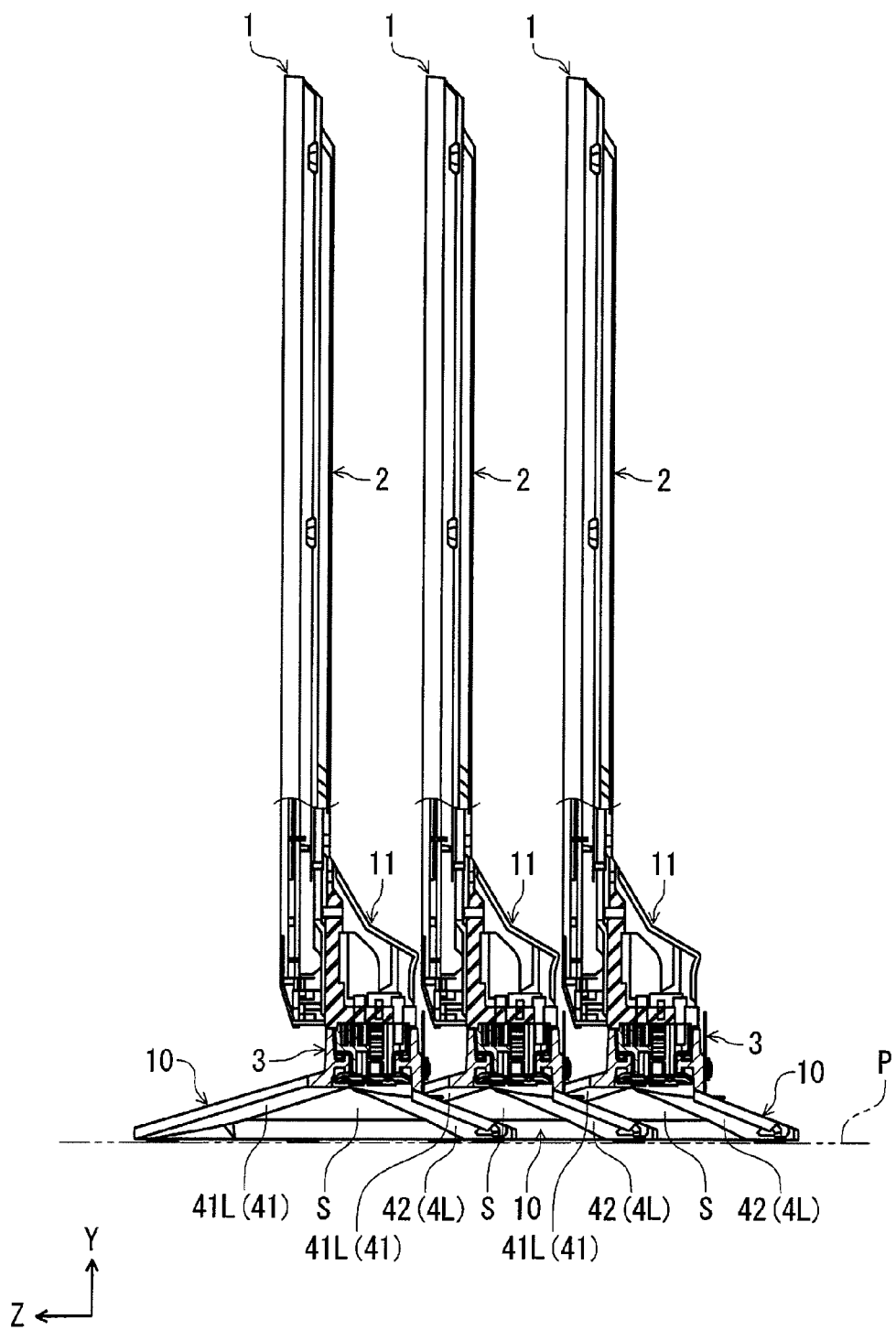
FIG. 9 shows a state that plural video display apparatus according to the embodiment are placed in contact with each other in the front-rear direction.

As shown in FIG. 9, since the space S is formed in such a manner that its front side is open with the legs (front legs, first legs, feet, arms, raised portions) 41 of the support portions 4L and 4R as opening edge portions, plural video display apparatus 1 can be placed closer to each other (arranged more densely) in the front-rear direction by inserting the rear portion of the stand 10 of one video display apparatus 1 into the space S of the stand 10 of another.

It is preferable that as shown in FIG. 3 the length L of the stand 10 be shorter than or equal to the width W or height H of the case 2. In the embodiment, the length L is shorter than the width W and the height H. This makes it easier to putting the stand 10 together with the case 2 into a packing box where the video display apparatus 1 is placed when a product is transported.

As shown in FIG. 17, the rotation support portion (connection portion) 3 has the movable portion (rotary portion, coupling portion, fitting portion, column portion) 3a, a fixing portion (support portion, cylinder portion) 3e, and slide members (lubrication member) 3f. The fixing portion 3e is provided with a cylindrical housing portion (receiving portion) 3g which extends to a vertical direction and houses the movable portion 3a, and a projection 3h which projects inward from its circumferential wall 3n at a middle position in the vertical direction. The movable portion 3a has an upper, first member (upper member, divisional body) 3i and a lower, second member (lower member, divisional body) 3k which is connected and fixed to the first member 3i with fixing insertion members 3j such as screws or bolts each having a hexagonal hole. The slide members 3f are disposed at three locations (i.e., on the top face, the inner circumferential face, and the bottom face of the projection 3h) and sandwiched between the projection 3h and the movable portion 3a (first member 3i or second member 3k). The slide members 3f are made of a synthetic resin material having a relatively small friction coefficient. The outer faces (sliding faces) of the slide members 3f may be formed with recesses such as holes or grooves, which serve as portions for holding lubricant such as grease. The fixing portion 3e of the rotation support portion 3 is integral with the stand 10. The top face (connection face) 9 of the movable portion 3a is formed with attachment holes 3m such as female screw holes to which the connection members 12 are attached which penetrate through the through-holes 11d of the attachment portion 11b of the connection portion 11 (see FIG. 8). The movable portion 3a is movable in a prescribed angular range around the rotation axis Ax which is the center axis of the rotation support portion 3. The fixing insertion members 3j are exposed to the space S, and hence can be attached and removed (for maintenance) by working from the side of the space S.

As shown in FIGS. 14, 15, 17, etc., the two first portions 41L and 41R are connected to the front portion 3b of the rotation support portion 3 so as to project to both sides (and to the front side). As a result, the legs 41 (first portions 41L and 41R, support portions 4L and 4R) can be connected to the circumferential wall 3n of the fixing portion 3e of the rotation support portion 3 over a greater length, whereby stress acting on the connection portion between the rotation support portion 3 and the legs 41 (support portions 4L and 4R) can be reduced.

Figure 13:
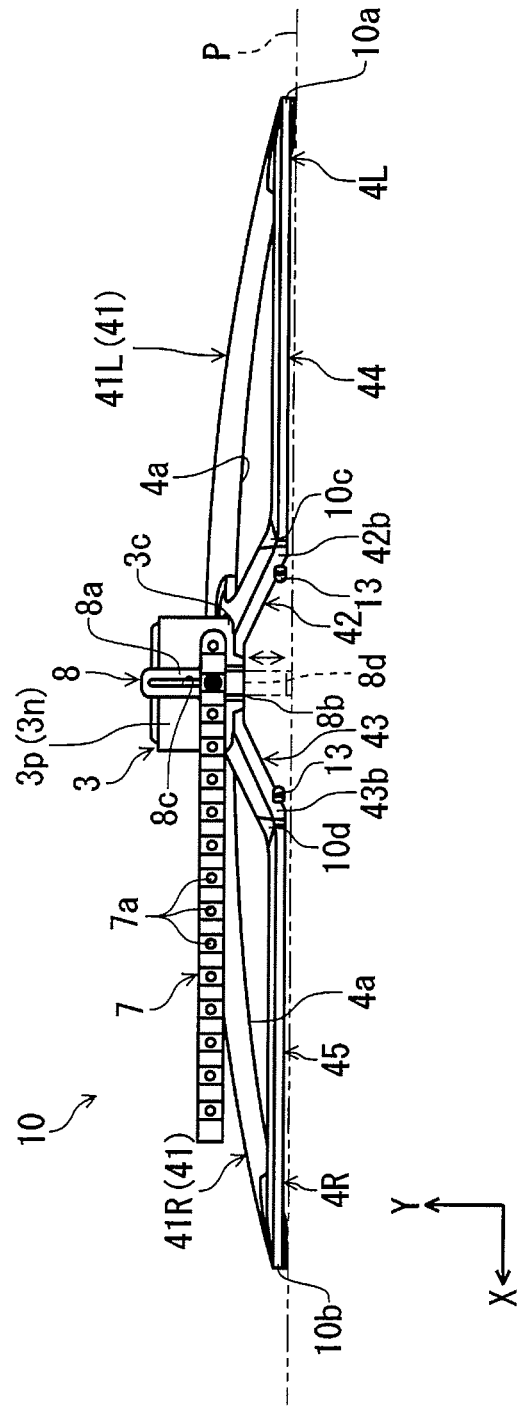
FIG. 13 is a rear view of the example stand.

As shown in FIG. 13, in the embodiment, fixing members 7 and 8 for fixing the video display apparatus 1 are attached (fixed) to a rear portion 3p of the circumferential wall 3n of the rotation support portion 3 by means of a single connection member 12 such as a screw. That is, the common connection member 12 serves to attach (fix) both fixing members 7 and 8. The fixing member 7 is a band which is made of a synthetic resin material, for example, and has a constant width. Plural through holes 7a through each of which a fixing insertion member such as a screw or a tying band (not shown) can be inserted are formed through the fixing member 7 at approximately regular intervals.

The fixing member 8 is provided so as to be able to be fixed to the rear portion of the stand 10 which is on the side opposite to the side to which the display screen 6a is exposed. The fixing member 8 has a narrow base portion 8a extending in the vertical direction alongside the circumferential wall 3n and a projection (erected portion, connection portion, attachment portion) 8b which projects from the bottom end (tip portion) of the base portion 8a. A long opening (slit, guide) through which the connection member 12 can be inserted is formed through the base portion 8a so as to extend in the longitudinal direction of the base portion 8a. A though-hole 8d through which a fixing insertion member such as a screw or a tying band (not shown) can be inserted is formed through the projection 8b. When the connection member 12 is loosened, the fixing member 8 goes down and the projection 8b comes into contact with an installation face (not shown). In this state, the fixing member 8 can be connected and fixed to the installation face. That is, the projection 8b of the fixing member 8 can be connected to an installation face in a state that the fixing member 8 is moved down and fixed to the rotation support portion 3 and is exposed under the rotation support portion 3 on the side opposite to the front side to which the display screen 6a is exposed.

The height of an installation face with respect to the fixing member 8 depends on the installation place. Since as described above the fixing member 8 is movable with respect to the stand 10, the fixing member 8 can be fixed to an installation face more reliably. When the fixing member 8 is not used, the fixing member 8 can be hidden behind the rotation support portion 3 when viewed from the front side by elevating the fixing member 8 by a distance corresponding to at least part of the length (in the embodiment, the full length) of the opening 8c and fixing the fixing member 8 to the rotation support portion 3 with the connection member 12. That is, when the fixing member 8 is fixed to the rotation support portion 3 with the connection member 12 in a state that the fixing member 8 is elevated, the fixing member 8 is hidden by the stand 10 when viewed from the front side to which the display screen 6a is exposed.

Instead of the single long opening 8c, plural circular holes may be formed through the fixing member 8, in which case the fixing member 8 is fixed to the rotation support portion 3 by inserting the connection member 12 into one of the plural holes. However, the single long opening 8c is advantageous in that the fixing position of the fixing member 8 can be adjusted by loosening the connection member 12 without the need for removing the fixing member 8 from the rotation support portion 3, and that the position of the fixing member 8 can be adjusted according to the height of the installation face.

The opening 8c of the fixing member 8 may be formed so as to be hidden behind the rotation support portion 3 when viewed from the front side in a state that the fixing member 8 is fixed to the rotation support portion 3 while being in contact with the plane P. In this case, a washer 14 as a buffer member may be inserted between the fixing member 8 and the rear portion 3p of the circumferential wall 3n of the rotation support portion 3.

As shown in FIGS. 13, 15, etc., the bottom faces (back faces) 42c and 43c of the tip portions 42b and 43b of the second portions (raised portions) 42 and 43 are formed with recesses (cuts) 42d and 43d, respectively. Wire insertion members (wire holding members, ring members) 13 are attached to the recesses 42d and 43d with connection members 12 such as screws, respectively. The wire insertion members 13 are provided, at their tips, with respective ring portions (annular portions, wound portions) 13a through each of which a wire member such as a wire or a band can penetrate. The video display apparatus 1 can be fixed using wire members that are inserted through the ring portions 13a. Those portions of the second portions 42 and 43 which are formed with the recesses 42d and 43d can serve as weak portions (easily deformable portions) that would become an origin of a bend, deformation, a break, or the like when too strong external force (load) acts on the stand 10.

In the above-described embodiment, the support portions 4L and 4R having the openings 4a can support the rotation support portion 3 which is elevated from the plane P. Since the support portions 4L and 4R are formed with the openings 4a by virtue of the elevated rotation support portion 3, it is made easier to attain at least one of such advantages as weight reduction, enhanced ease of holding the stand 10, and suppression of an appearance of the stand 10 on the display screen 6a through reflection.

In the embodiment, the bridge portions 44 and 45 are provided as the bottom portions of the support portions 4L and 4R. This allows the video display apparatus 1 including the case 2 to be placed more stably than in a case that the bridge portions 44 and 45 are not provided as bottom portions.

In the embodiment, the bridge portions 44 and 45 are bent. This allows the video display apparatus 1 including the case 2 to be placed more stably than in a case that the bridge portions 44 and 45 are not bent.

In the embodiment, the bridge portions 44 and 45 are bent so as to be convex toward the sides that are opposite to the rotation support portion 3. As long as the support portions 4L and 4R are sufficiently rigid, a more stable support state can be obtained as the support portions 4L and 4R are more distant from the center of gravity of the case 2. Therefore, the bridge portions 44 and 45 which are bent so as to be convex toward the sides that are opposite to the rotation support portion 3 allow the video display apparatus 1 including the case 2 to be placed more stably.

In the embodiment, the first portion 41L or 41R and the second portion 42 or 43 extend with the opening 4a interposed in between and part of the first portion 41L or 41R, and the first portion 41L or 41R is located on the left or right of the second portion 42 or 43 when viewed from the front side. That is, the first portion 41L or 41R is deviated to the left or right from the second portion 42 or 43 when viewed from the front side. This allows the video display apparatus 1 including the case 2 to be placed more stably in the right-left direction.

In the embodiment, the plural support portions 4L and 4R are provided. This allows the video display apparatus 1 including the case 2 to be placed more stably than in a case that a single support portion is provided.

In the embodiment, one of the plural support portions 4L and 4R is located on the left or right of the other. The plural support portions 4L and 4R disposed in such a manner allow the video display apparatus 1 including the case 2 to be placed more stably.

<Modifications>

FIGS. 22 to 30 are plan views of stands 10A to 10I according to modifications of the embodiment. In each of FIGS. 22 to 30, for the sake of convenience, placement points and portions that are at approximately the same height as the placement points are indicated by dots. Each of the stands 10A to 10I according to modifications can be used in place of the stand 10 according to the first embodiment.

Figure 22:
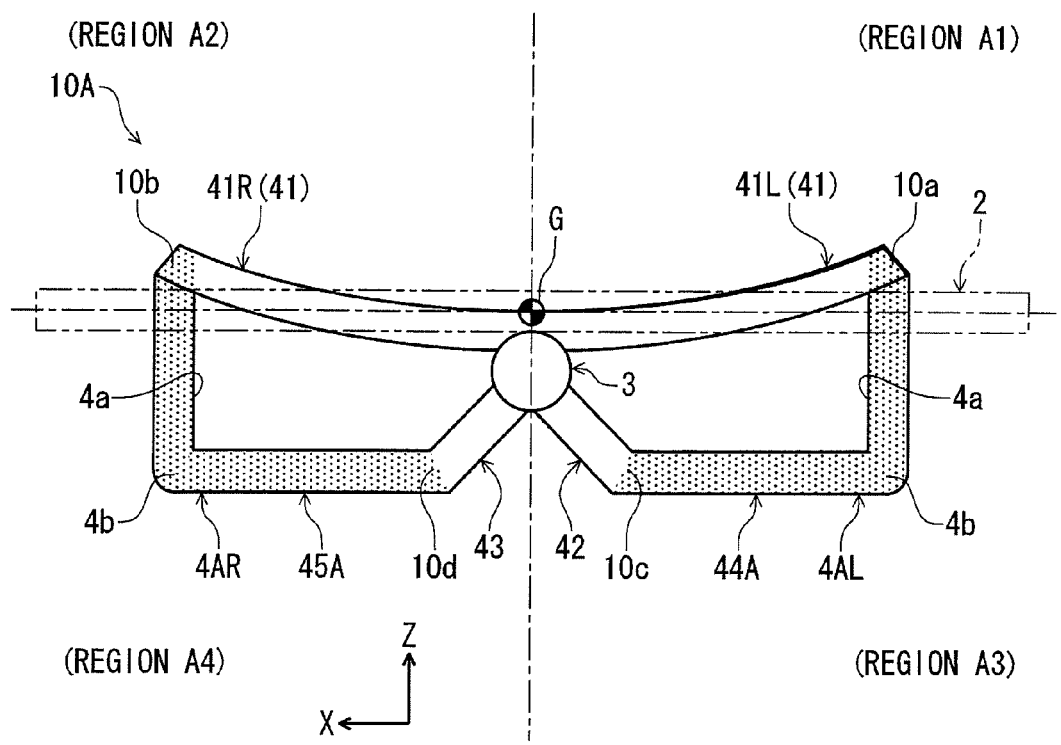
FIG. 22 is a schematic plan view of a stand of a video display apparatus according to a modification of the embodiment.

In the modified stand 10A shown in FIG. 22, a support portion 4AL has a first portion 41L, a second portion 42, and a bridge portion 44A. A support portion 4AR has a first portion 41R, a second portion 43, and a bridge portion 45A. That is, the stand 10A according to this modification is different from the stand 10 according to the first embodiment in the shapes of the bridge portions 44A and 45A. In the modification, each of the bridge portions 44A and 45A has an angled portion 4b which is convex toward the side that is opposite to the center of gravity G of the case 2 and the rotation support portion 3. Each of the bridge portions 44A and 45A has a portion that extends in the front-rear direction (Z direction) and a portion that extends in the right-left direction (X direction). In the modification, the four end points 10a to 10d are arranged in a similar manner to the manner of the embodiment. More specifically, the end portion (placement point) 10a is in a region (first region) A1 that is located on the front side and the left side (as viewed from the front side) of the center of gravity G of the case 2. The end portion (placement point) 10b is in a region (first region) A2 that is located on the front side and the right side (as viewed from the front side) of the center of gravity G of the case 2. The end portion (placement point) 10c is in a region (second region) A3 that is located on the rear side and the left side (as viewed from the front side) of the center of gravity G of the case 2. The end portion (placement point) 10d is in a region (second region) A4 that is located on the rear side and the right side (as viewed from the front side) of the center of gravity G of the case 2. As such, the stand 10A can support the case 2 more stably from all of the front side, rear side, the right side, and the left side. Furthermore, since each of the bridge portions 44A and 45A has the angled portion 4b, the stand 10A according to the modification can support the case 2 even more stably in each of the front-rear direction and the right-left direction.

Figure 23:
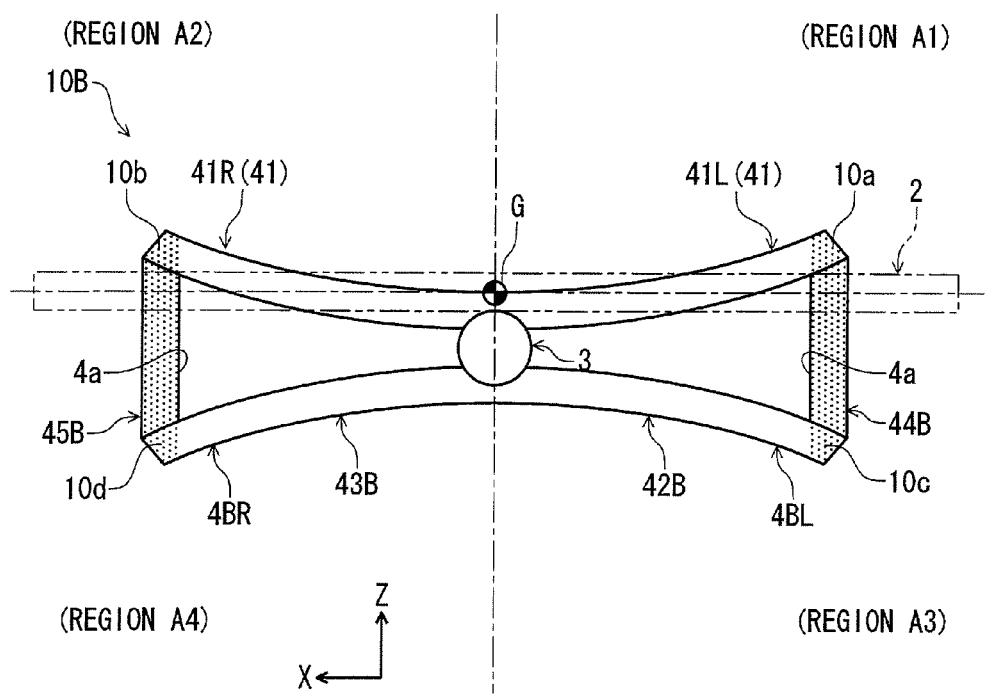
FIG. 23 is a schematic plan view of a stand of a video display apparatus according to another modification of the embodiment.

In the modified stand 10B shown in FIG. 23, a support portion 4BL has a first portion 41L, a second portion 42B, and a bridge portion 44B. A support portion 4BR has a first portion 41R, a second portion 43B, and a bridge portion 45B. That is, the stand 10B according to this modification is different from the stand 10 according to the first embodiment in the shapes of the second portions 42B and 43B and the bridge portions 44B and 45B. In the modification, the second portions 42B and 43B are in a mirror image relationship with (face-symmetrical with) the respective first portions 41L and 41R. In the modification, the bridge portion 44B extends straightly in the front-rear direction between the end points 10a and 10b and the bridge portion 45B extends straightly in the front-rear direction between the end points 10c and 10d. In the modification, the four end points 10a to 10d are arranged in a similar manner to the manner of the embodiment. More specifically, the end portion (placement point) 10a is in a region (first region) A1 that is located on the front side and the left side (as viewed from the front side) of the center of gravity G of the case 2. The end portion (placement point) 10b is in a region (first region) A2 that is located on the front side and the right side (as viewed from the front side) of the center of gravity G of the case 2. The end portion (placement point) 10c is in a region (second region) A3 that is located on the rear side and the left side (as viewed from the front side) of the center of gravity G of the case 2. The end portion (placement point) 10d is in a region (second region) A4 that is located on the rear side and the right side (as viewed from the front side) of the center of gravity G of the case 2. As such, the stand 10B can support the case 2 more stably from all of the front side, rear side, the right side, and the left side. This modification thus provides the same advantages as the first embodiment.

Figure 24:
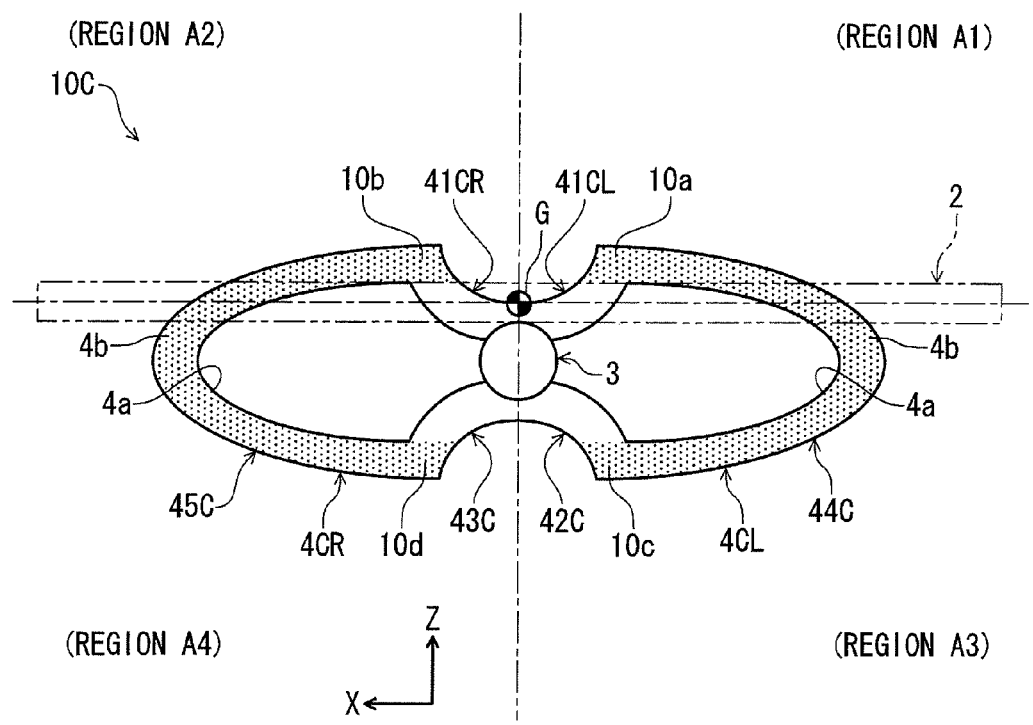
FIG. 24 is a schematic plan view of a stand of a video display apparatus according to another modification of the embodiment.

In the modified stand 10C shown in FIG. 24, a support portion 4CL has a first portion 41CL, a second portion 42C, and a bridge portion 44C. A support portion 4CR has a first portion 41CR, a second portion 43C, and a bridge portion 45C. In the modification, the first portions 41CL and 41CR are in a mirror image relationship with (face-symmetrical with) the respective second portions 42C and 43C. Each of the first portions 41CL and 41CR and the second portions 42C and 43C is in a circular arc shape having a relatively small radius of curvature. Each of the support portions 4CL and 4CR, including the bridge portion 44C or 45C, is face-symmetrical with respect to the XY plane that passes through the center of the rotation support portion 3. Each of the bridge portions 44C and 45C has a bent portion 4b which is convex toward the side that is opposite to the center of gravity G of the case 2 and the rotation support portion 3. In the modification, the four end points 10a to 10d are arranged in a similar manner to the manner of the embodiment. More specifically, the end portion (placement point) 10a is in a region (first region) A1 that is located on the front side and the left side (as viewed from the front side) of the center of gravity G of the case 2. The end portion (placement point) 10b is in a region (first region) A2 that is located on the front side and the right side (as viewed from the front side) of the center of gravity G of the case 2. The end portion (placement point) 10c is in a region (second region) A3 that is located on the rear side and the left side (as viewed from the front side) of the center of gravity G of the case 2. The end portion (placement point) 10d is in a region (second region) A4 that is located on the rear side and the right side (as viewed from the front side) of the center of gravity G of the case 2. As such, the stand 10C can support the case 2 more stably from all of the front side, rear side, the right side, and the left side. This modification thus provides the same advantages as the first embodiment.

Figure 25:
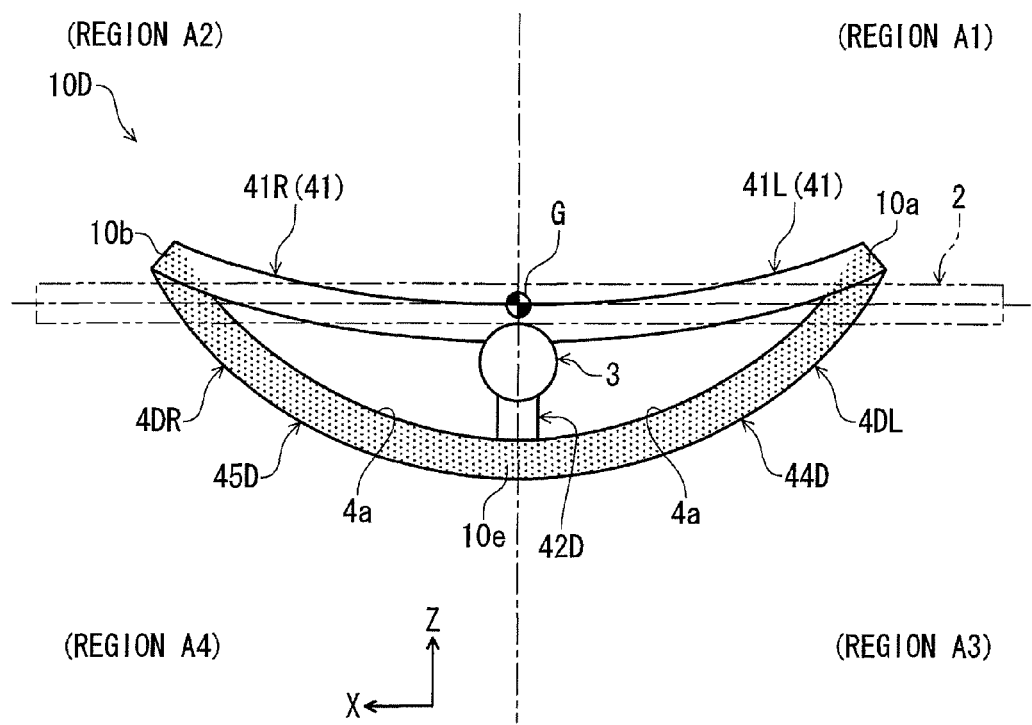
FIG. 25 is a schematic plan view of a stand of a video display apparatus according to another modification of the embodiment.

In the modified stand 10D shown in FIG. 25, a support portion 4DL has a first portion 41L, a second portion 42D, and a bridge portion 44D. A support portion 4DR has a first portion 41R, the second portion 42D, and a bridge portion 45D. That is, in this modification, the two support portions 4DL and 4DR share the second portion 42D. In the modification, the end portion (placement point) 10a is in a region (first region) A1 that is located on the front side and the left side (as viewed from the front side) of the center of gravity G of the case 2. The end portion (placement point) 10b is in a region (first region) A2 that is located on the front side and the right side (as viewed from the front side) of the center of gravity G of the case 2. An end portion (placement point) 10e is on the boundary between a region (second region) A3 that is located on the rear side and the left side (as viewed from the front side) of the center of gravity G of the case 2 and a region (second region) A4 that is located on the rear side and the right side (as viewed from the front side) of the center of gravity G of the case 2. The bridge portions 44D and 45D are at approximately the same height as the placement points 10a, 10b, and 10e. The bridge portion 44D extends across the region A3 to reach the front-left region A1, and the bridge portion 45D extends across the region A3 to reach the front-right region A2. As such, the stand 10D can support the case 2 more stably from all of the front side, rear side, the right side, and the left side. This modification thus provides the same advantages as the first embodiment.

Figure 26:
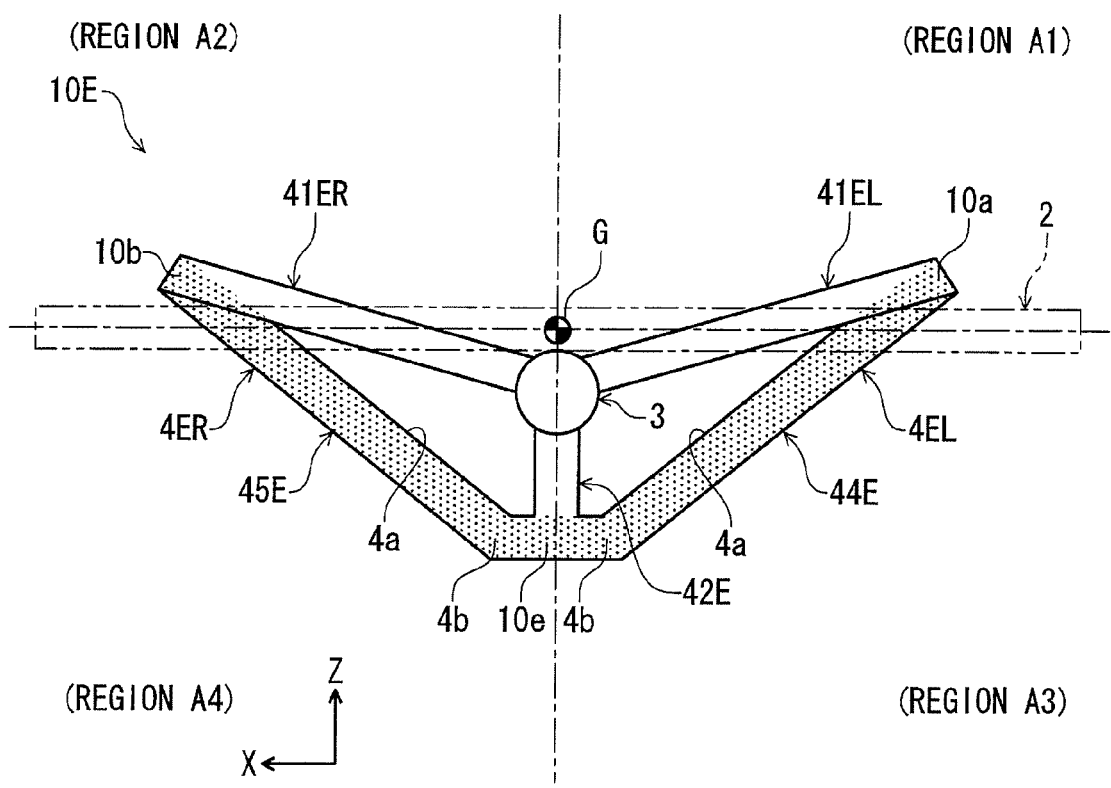
FIG. 26 is a schematic plan view of a stand of a video display apparatus according to still another modification of the embodiment.

In the modified stand 10E shown in FIG. 26, a support portion 4EL has a first portion 41EL, a second portion 42E, and a bridge portion 44E. A support portion 4ER has a first portion 41ER, the second portion 42E, and a bridge portion 45E. That is, also in this modification, the two support portions 4EL and 4ER share the second portion 42E. The stand 10E according to this modification is obtained by basically straightening the individual portions of the support portions 4DL and 4DR of the stand 10D according to the modification of FIG. 25, and the individual portions of the support portions 4EL and 4ER are arranged in the same manner with respect to the regions A1 to A4 as those of the support portions 4DL and 4DR. Therefore, this modification provides the same advantages as the modification of FIG. 25, that is, as the first embodiment. Furthermore, since each of the bridge portions 44E and 45E has an angled portion 4b, the stand 10E according to this modification can support the case 2 even more stably.

Figure 27:
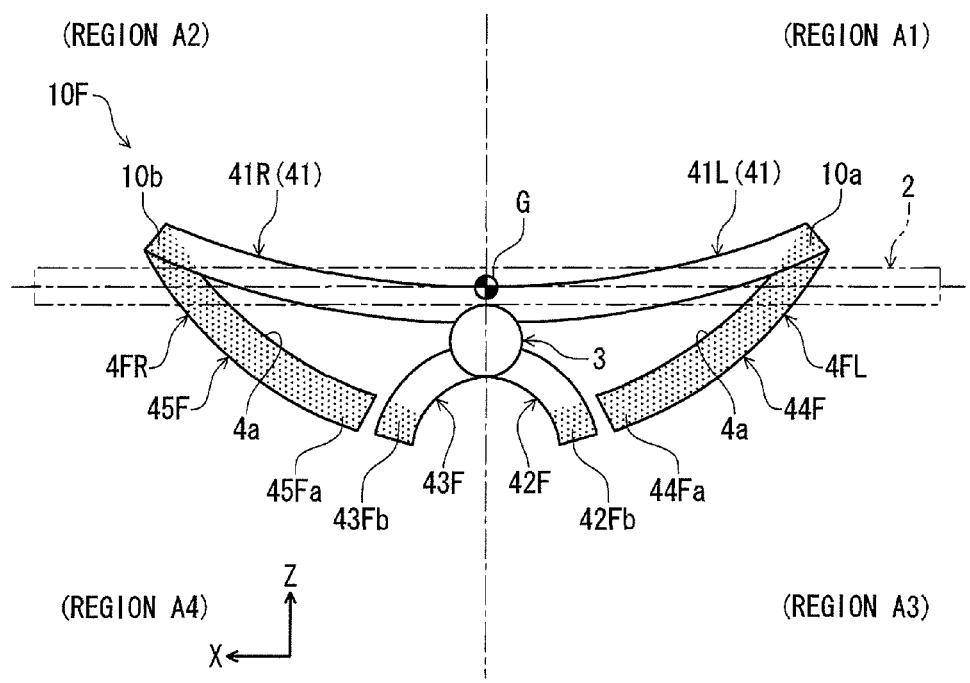
FIG. 27 is a schematic plan view of a stand of a video display apparatus according to another modification of the embodiment.

In the modified stand 10F shown in FIG. 27, a support portion 4FL has a first portion 41L, a second portion 42F, and a bridge portion 44F. A support portion 4FR has a first portion 41R, a second portion 43F, and a bridge portion 45F. However, in this modification, the bridges portions 44F and 45F are not connected to the respective second portions 42F and 43F. More specifically, an end portion (inward end portion) 44Fa of the bridge portion 44F is separated from a tip portion 42Fb of the second portion 42F and an end portion (inward end portion) 45Fa of the bridge portion 45F is separated from a tip portion 43Fb of the second portion 43F. However, since the end portions 44Fa and 45Fa of the bridge portions 44F and 45F which extend from the regions A1 and A2 are located in the regions A3 and A4, respectively, the end portions 44Fa and 45Fa which are located in the regions A3 and A4 are connected to the rotation support portion 3 via the first portions 41L and 41R, respectively, even if the second portions 42F and 43F are unfunctional. Therefore, in this modification, the function that the stand 10F supports the case 2 more stably is not prone to be impaired.

Figure 28:
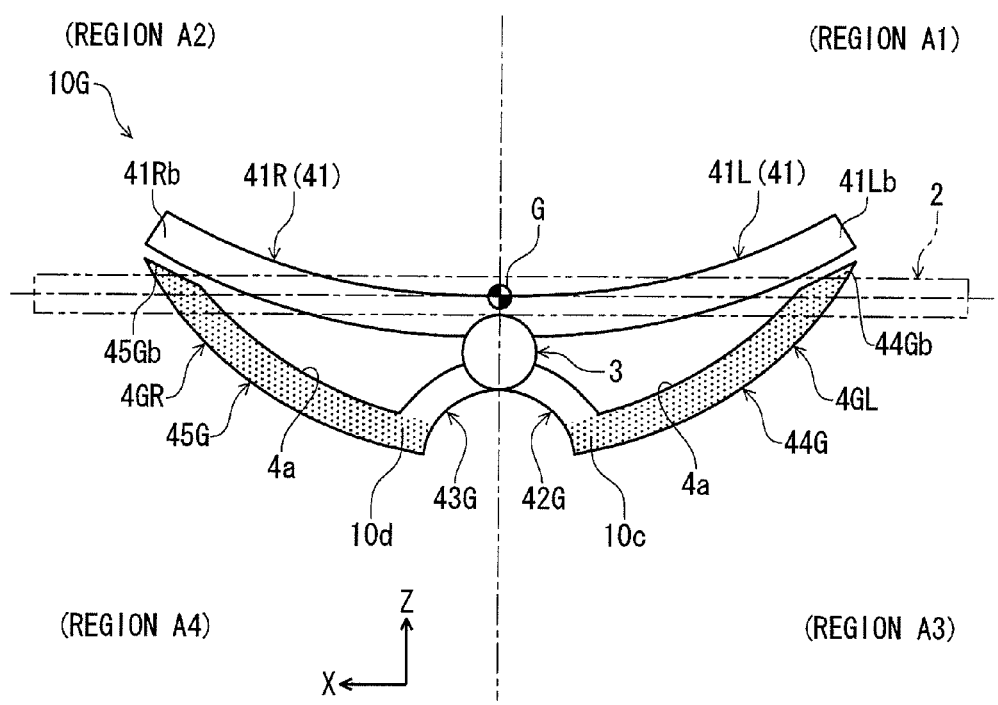
FIG. 28 is a schematic plan view of a stand of a video display apparatus according to another modification of the embodiment.

In the modified stand 10G shown in FIG. 28, a support portion 4GL has a first portion 41L, a second portion 42G, and a bridge portion 44G. A support portion 4GR has a first portion 41R, a second portion 43G, and a bridge portion 45G. However, in this modification, the bridges portions 44G and 45G are not connected to the respective first portions 41L and 41R. More specifically, an end portion (outward end portion) 44Gb of the bridge portion 44G is separated from a tip portion 41Lb of the first portion 41L and an end portion (outward end portion) 45Gb of the bridge portion 45G is separated from a tip portion 41Rb of the first portion 41R. However, since the end portions 44Gb and 45Gb of the bridge portions 44G and 45G which extend across the regions A3 and A4 are located in the regions A1 and A2, respectively, the end portions 44Gb and 45Gb which are located in the regions A1 and A2 are connected to the rotation support portion 3 via the second portions 42G and 43G, respectively, even if the first portions 41L and 41R are unfunctional. Therefore, in this modification, the function that the stand 10G supports the case 2 more stably is not prone to be impaired.

Figure 29:
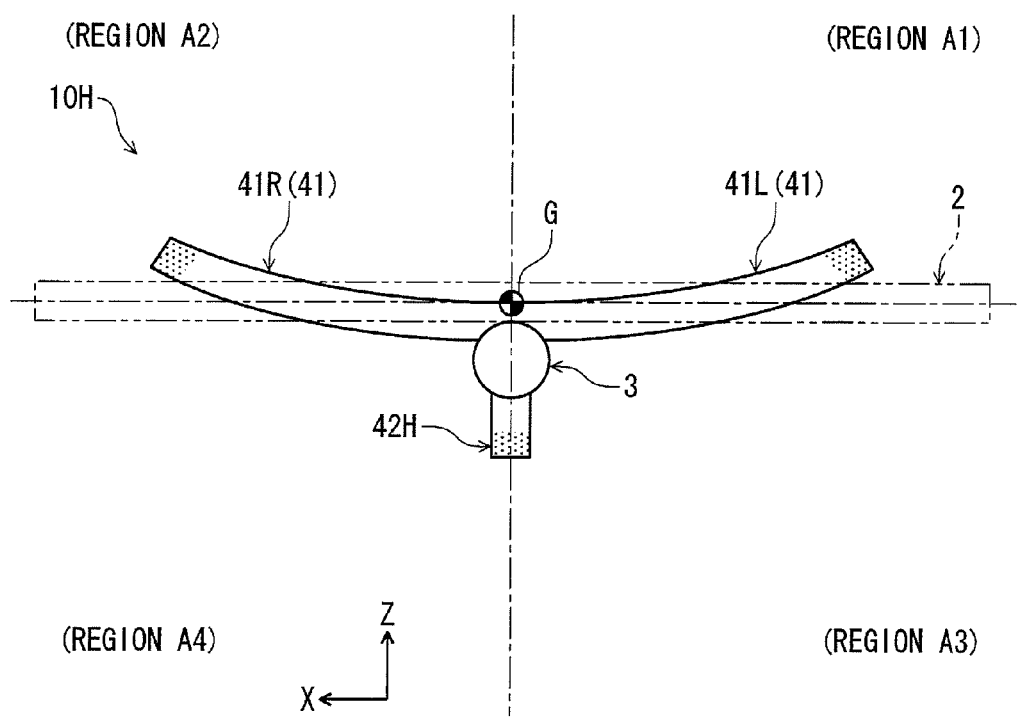
FIG. 29 is a schematic plan view of a stand of a video display apparatus according to yet another modification of the embodiment.
Figure 30:
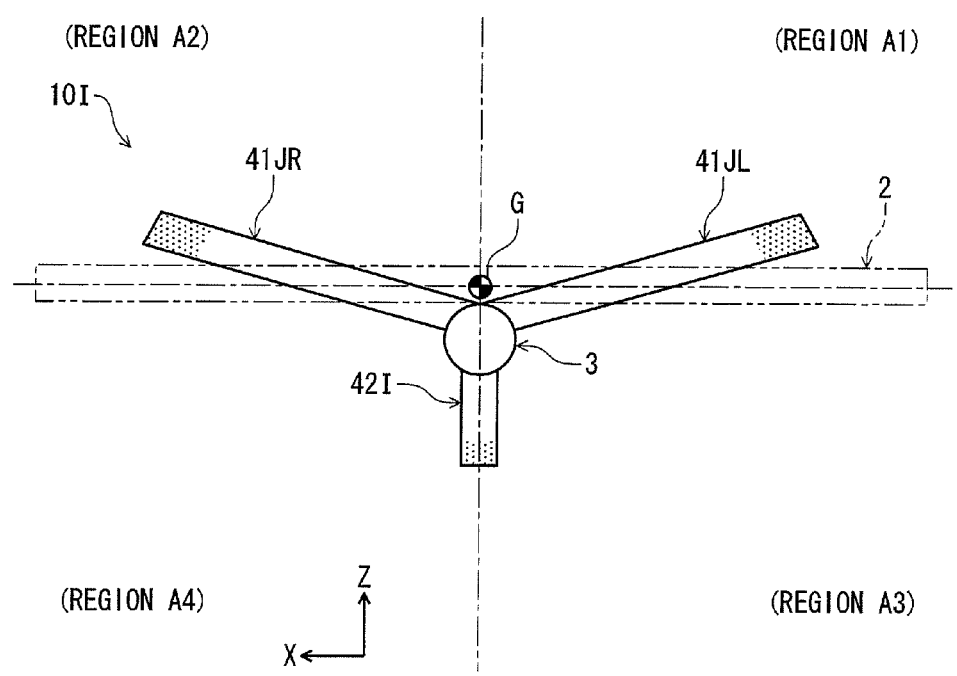
FIG. 30 is a schematic plan view of a stand of a video display apparatus according to a further modification of the embodiment.

The modified stand 10H shown in FIG. 29 has first portions 41L and 41R and a second portion 42H but does not have any bridge portions. Also in this modification, the rotation support portion 3 is supported in an elevated state and corresponding advantages are obtained. Likewise, the modified stand 10I shown in FIG. 30 has first portions 41L and 41R and a second portion 42I but does not have any bridge portions. Also in this modification, the rotation support portion 3 is supported in an elevated state and corresponding advantages are obtained.

Although the embodiment of the invention and its modifications have been described above, the embodiment and the modifications are just examples and should not be construed as restricting the scope of the invention. The embodiment and the modifications can be practiced in other various forms, and part of each can be omitted, replaced by other elements, or changed in various manners without departing from the spirit and scope of the invention. For example, the concepts of the embodiment and the modifications can also be applied to video display apparatus other than TV receivers such as display devices not having a tuner etc. and other types of electronic apparatus which have a support stand. These further modifications are also included in the invention as claimed and its equivalents.

The invention can be practiced in such a manner that the specifications (structures, shapes, sizes, lengths, widths, thicknesses, heights, numbers, arrangements, positions, materials, etc.) of the video display apparatus, the case, the first wall portion, the second wall portion, the third wall portion, the first opening, the display device, the connection portions, the rotation support portion, the support portions, the second openings, the raised portions, the first portions, the second portions, the bridge portions, etc. are changed as appropriate.

The invention can provide a video display apparatus in which a rotation support portion can be located at a higher position with less inconveniences.

What is claimed is:

1. A display apparatus comprising:
   a display case including a display screen which is exposed to an outside on one side of the display case;
   a support member configured to support the display case; and
   a fixing member configured to be provided on a side opposite to the one side so as to be fixed to the support member at a first position and a second position, and which includes a connector configured to be connected to an external installation face when the fixing member is fixed at the first position, wherein
   the support member includes a first bottom portion and a second bottom portion which is located closer to the display case than the first bottom portion, and
   the fixing member is configured to project from the second bottom portion to the side opposite to the display case and is configured to be seen from the one side when the fixing member is fixed to the support member at the first position, and the fixing member is configured to be hidden behind the support member and is configured to be not seen from the one side when the fixing member is fixed to the support member at the second position.

2. The apparatus of claim 1, wherein the fixing member includes at least one hole, and the fixing member is configured to be attached to the support member with a fixing insertion member that penetrates through the hole.

3. The apparatus of claim 2, wherein the fixing member includes a long hole extending in a longitudinal direction of the fixing member, and the fixing member is configured to be attached to the support member with a screw that penetrates through the long hole.

4. The apparatus of claim 3 further comprising:
a buffer member configured to be inserted between the support member and the fixing member.

5. The apparatus of claim 2, wherein the hole is configured to be formed at such a position that the fixing member is hidden behind the support member and is not seen from the one side when the fixing member is fixed to the support member at the second position.

6. The apparatus of claim 2, wherein the fixing member includes a plurality of holes arranged in a longitudinal direction of the fixing member and, the fixing member is configured to be attached to the support member with a fixing insertion member that penetrates through one of the plurality of holes.

7. A support stand capable of supporting a display case which includes a display screen, comprising:
a first connector configured to be connected to the display case;
a first bottom portion;
a second bottom portion configured to be located closer to the first connector than the first bottom portion is; and
a fixing member configured to be fixed to the support stand at a first position and a second position on a side opposite to a side to which the display screen is directed when the first connection portion is connected to the display case, wherein
the fixing member includes a second connector configured to be connected to an external installation face when the fixing member is fixed to the support stand at the first position, and
the fixing member is configured to project from the second bottom portion to a side opposite to a first connector side of the second bottom portion and is configured to be seen from the side to which the display screen is directed when the fixing member is fixed to the support stand at the first position, and the fixing member is configured to be hidden behind the support member and is configured to be not seen from the side to which the display screen is directed when the fixing member is fixed to the support stand at the second position.

* * * * *